(12) United States Patent
Bandopadhyay

(10) Patent No.: US 9,916,551 B1
(45) Date of Patent: Mar. 13, 2018

(54) BUSINESS CONTINUITY OPTIMIZATION

(71) Applicant: Veritas Technologies LLC, Mountain View, CA (US)

(72) Inventor: Tushar Bandopadhyay, San Jose, CA (US)

(73) Assignee: Veritas Technologies LLC, Mountain View, CA (US)

( * ) Notice: Subject to any disclaimer, the term of this patent is extended or adjusted under 35 U.S.C. 154(b) by 637 days.

(21) Appl. No.: 14/530,286

(22) Filed: Oct. 31, 2014

(51) Int. Cl.
*H04L 12/24* (2006.01)
*G06Q 10/06* (2012.01)

(52) U.S. Cl.
CPC ....... *G06Q 10/06315* (2013.01); *H04L 41/08* (2013.01); *H04L 41/0803* (2013.01); *H04L 41/0813* (2013.01)

(58) Field of Classification Search
CPC ............. H04L 41/5009; H04L 41/5003; H04L 41/5019; H04L 41/08; H04L 41/0813; H04L 41/0803; H04L 41/12
See application file for complete search history.

(56) References Cited

U.S. PATENT DOCUMENTS

| | | | | |
|---|---|---|---|---|
| 6,115,393 A * | 9/2000 | Engel | ................. | H04L 41/0213 370/469 |
| 7,020,145 B1 * | 3/2006 | Symons | ................. | H04L 12/46 370/400 |
| 7,386,610 B1 * | 6/2008 | Vekiarides | .......... | G06F 11/2071 709/213 |
| 2004/0042416 A1 * | 3/2004 | Ngo | ...... | H04L 12/467 370/254 |
| 2004/0172467 A1 * | 9/2004 | Wechter | ................. | H04L 41/12 709/224 |
| 2013/0159461 A1 * | 6/2013 | Al Faruque | ............ | H04L 67/32 709/217 |
| 2014/0087777 A1 * | 3/2014 | Guo | .................... | H04L 27/0006 455/512 |
| 2015/0193317 A1 * | 7/2015 | Firley | .................... | H04L 69/40 714/4.11 |
| 2016/0344582 A1 * | 11/2016 | Shivanna | ................ | H04L 41/04 |

* cited by examiner

*Primary Examiner* — Jeong S Park
(74) *Attorney, Agent, or Firm* — Campbell Stephenson LLP

(57) ABSTRACT

Disclosed are methods and systems for optimizing business continuity in IT environments. One such method involves comparing a representation and a template. The representation represents units of computing entities, and relationships between the units of computing entities. The method determines whether a system represented by the representation meets a threshold represented by the template based on a result of the comparing, and provides a result of the determining. The threshold can established by a disaster recovery site, a service level agreement, or a configuration drift, and the result of the determining can be used to evaluate the disaster recovery site, the service level agreement, or the configuration drift.

22 Claims, 16 Drawing Sheets

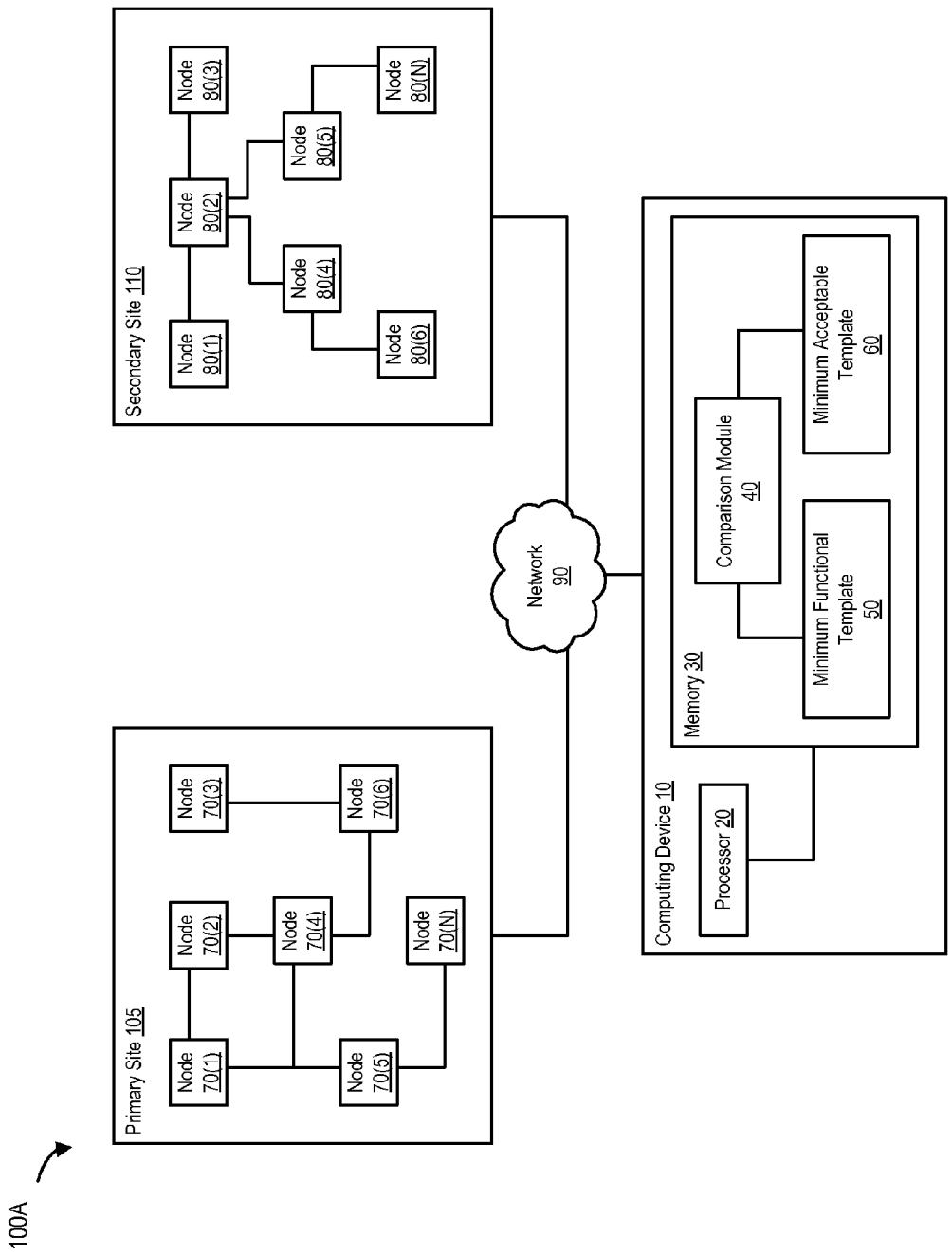

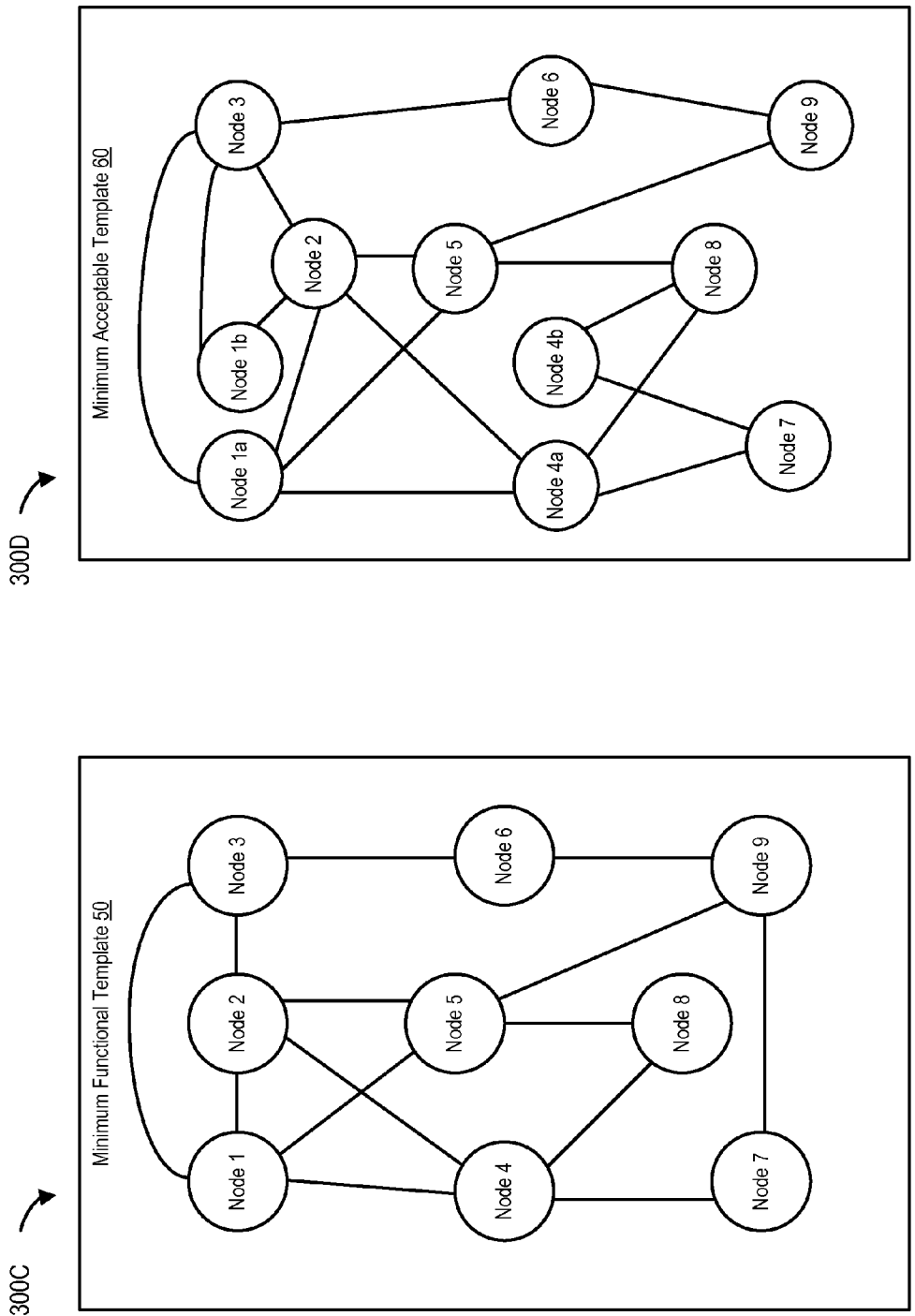

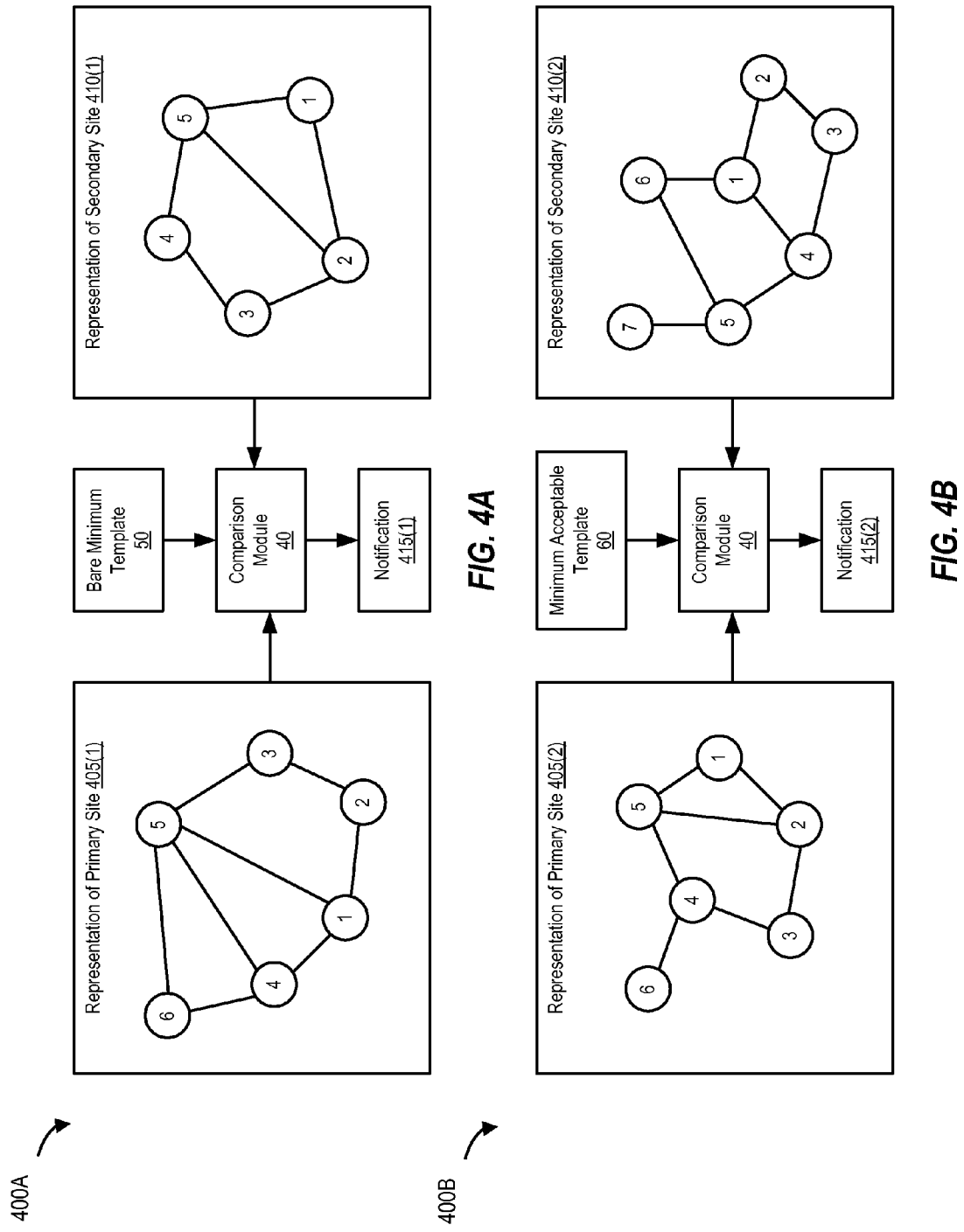

BUSINESS CONTINUITY OPTIMIZATION

FIELD OF THE INVENTION

This invention relates to business continuity and, more particularly, to optimizing information technology (IT) services that provide business continuity.

DESCRIPTION OF THE RELATED ART

Modern information technology (IT) business services involve multiple tiers of applications, databases, servers, and other various computing devices, both hardware and software, that provide one or more services (e.g., banking transaction services, online shopping services, human resources management services, etc.). Ensuring the continued (and efficient) functioning of such services in an IT business environment can be important to many companies. For example, downtime caused by the failure of a payment processing server can cost an electronic commerce website thousands, if not millions of dollars, in lost sales. Therefore, maintaining business continuity is necessary for such companies.

Maintaining business continuity requires the monitoring, validation, and verification of critical data center components such as servers and databases that serve business critical applications. However, given the logistical, organizational, and technical complexities of modern data centers, it can be difficult to effectively monitor, validate, and verify business continuity policies and/or procedures.

For example, it would be useful to determine whether disaster recovery scenarios, service level agreements, and/or configuration drift levels associated with a data center are met, or not met. Based on such information, appropriate changes and/or adjustments can be made to business continuity policies and/or procedures. Therefore, having the ability to proactively make such rectifications can ensure IT business continuity by meeting (or exceeding) established expectations of IT business services.

SUMMARY OF THE INVENTION

Disclosed are methods and systems for optimizing business continuity in IT environments. One such method involves comparing a representation and a template. The representation represents units of computing entities, and relationships between the units of computing entities. The method determines whether a system represented by the representation meets a threshold represented by the template based on a result of the comparing, and provides a result of the determining In some embodiments, the threshold is established by a disaster recovery scenario, a service level agreement, or a configuration drift.

In one embodiment, the method involves receiving a user input from a user. In this example, the user input includes the representation. The method then performs clusters the representation into one or more groups, which represent a minimum functional operating state of the primary site. The minimum functional operating state is represented by the minimum functional template, which is stored on a computing device.

In some embodiments, the clustering is based on one or more similar characteristics shared between two or more units of computing entities, and can be performed using a clustering algorithm which implements hierarchical clustering. The method then notifies the user of the minimum functional operating state of the primary site as represented by the minimum functional template. In other embodiments, the method receives another user input from a user which indicates a minimum acceptable operating state of the primary site. The method involves creating a minimum acceptable template based on the minimum acceptable operating state. In this example, the minimum acceptable template is a representation of the minimum acceptable operating state of the primary site, which like the minimum functional template, is stored on a computing device.

In some embodiments, the similar characteristics shared between two or more units of computing entities include similar hardware attributes shared between two or more of each of the plurality of units of computing entities, or a range of hardware attributes. The representation of the minimum functional operating state of the primary site created by the clustering includes representing the units of computing entities using one or more vertices.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 1A is a block diagram of a computing device that implements a IT business continuity platform, according to one embodiment of the present invention.

FIG. 3C is a block diagram of a representation of a minimum functional template, according to one embodiment of the present invention.

FIG. 3D is a block diagram of a representation of a minimum acceptable template, according to one embodiment of the present invention.

FIG. 4A is a block diagram of a representation of a primary site and a secondary site, according to one embodiment of the present invention.

FIG. 4B is block diagram of another representation of a primary site and a secondary site, according to one embodiment of the present invention.

Figure 1B:
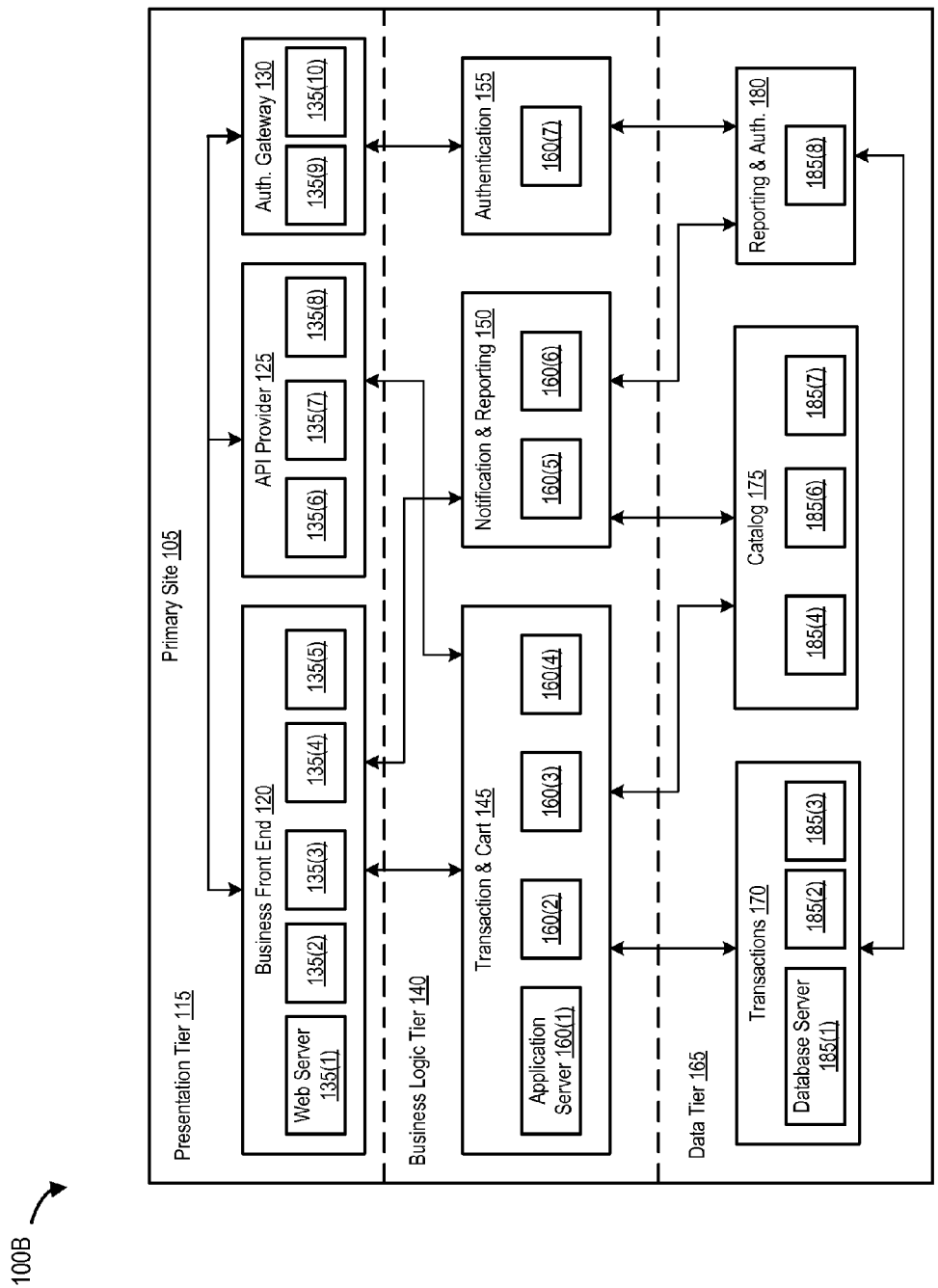
FIG. 1B is a block diagram of an example of a multi-layer IT architecture, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction to IT Business Continuity

There are many threats that organizations face today when it comes to the reliability and viability of their data. Logical corruption, or loss of data due to threats such as viruses and software bugs, can be avoided by ensuring that there is a viable copy of data available at all times. Performing regularly scheduled backups of the organizations' data typically protects against logical types of data loss. Another threat that may result in data loss is component or hardware failure. While most devices have begun to build in redundancy, there are other technologies such as application clustering technologies that can protect against a failure of a component while continuing to enable applications to be available.

Just as the levels of protection for logical and component failures have grown, so has the reliance on the information systems being protected. Many companies now realize that logical and local protection is no longer enough to guarantee that crucial applications will continue to be accessible. Losing access to critical applications can stem from planned downtime, such as complete site maintenance, to unplanned downtime, such as downtime caused by power or cooling loss, to natural disasters, such as fire and flooding, to acts of terrorism or war. The loss of a complete data center facility would so greatly affect an organization's capability to function that organizations strive to establish protection that can maintain availability of critical applications at all times.

To prevent the loss of functionality of a data center, and consequently a business critical application being served by the data center, organizations typically implement one or more information technology (IT) business continuity policies and procedures. For example, organizations can implement disaster recovery scenarios, which, among others, can include maintaining (and provisioning) another data center at a secondary site (which can act as a disaster recovery site), verifying (and accordingly updating) Service Level Agreements (SLAs), and monitoring configuration drift levels.

However, given the complexity of a modern data center (e.g., a data center involving a multi-tier IT architecture), visualization, planning, and management of IT infrastructure and IT services must be accounted for and reported (e.g., to an organization's IT director and/or administrator) so that such IT services and IT infrastructure components respond as desired in the event of disaster and/or failure. In particular, the organization's IT director and/or administrator must be able to proactively take steps to improve and/or fine tune the performance of the data center in preparation for a disaster scenario. A business continuity platform can help establish and achieve this goal.

Goals of IT Business Continuity

The goal of an IT business continuity platform is to help define the objectives related to protection, performance, and availability of a data center before, during, and after an undesired event—or even during day-to-day operations. Typically, the protection goals fall into at least two categories, among others. They include resiliency, which measures the extent of faults and/or disruptions that can be tolerated at each level of a multi-tier IT architecture before declaring outage, and restorability, which determines how an IT service can be restored.

To establish resiliency and restorability of IT services, Service Level Agreements (SLAs) can be established. One example of implementing an SLA can involve visualizing business critical computing entities, applications, and configurations (e.g., of a data center at a primary site), and further, discovering applications being served by the data center as well as the dependencies (e.g., connectivity relationships) between various computing entities of the data center. The process can also involve establishing, monitoring, and maintaining the SLA. In addition, a reporting and/or notification of the health of the data center can also be useful (e.g., to an organization's IT director and/or IT administrator), for proactively making changes (or adjustments) to the SLA and/or configurations of the data center (e.g., changing the configuration of a disaster recovery site by adding or removing computing entities or modifying the connectivity relationship between such computing entities) to better meet and manage IT service expectations and requirements.

An Example of a Data Center with Multi-Tier Architecture

A modern data center is a complex collection of hardware and software components each with interdependencies. For example, a modern data center is more than just a three-tier IT architecture where each tier is a single application, computing system, or server cluster. A modern data center can include scale-out configurations that use virtualization frameworks, which can enable predictive and reactive control of applications, computing entities, and storage devices. In addition, a modern data center can include data heavy applications which require databases to be implemented on high-end physical systems.

For example, a modern data center implemented at a primary site can include multiple tiers such as a presentation tier, a business logic tier, and a data tier. Various computing entities in each tier may be grouped together to provide a certain business functionality (e.g., computing entities in the business logic tier can be grouped together to provide authentication services, payment processing services, transaction services, etc.). Similarly, a data tier can include several different databases, and a presentation tier can include several virtual machines which perform the function of a web server. Each computing entity in the data center can be a heterogeneous computing entity and can provide the role of load balancing and/or redundancy to other computing entities in the data center.

A heterogeneous computing entity is a computing device that is different (and separate) than another computing device in a data center. A data center can involve several heterogeneous computing entities such as web servers, application servers, database servers, etc. It should be noted that although a data center can include several heterogeneous (or separate) computing entities, the heterogeneous computing entities may share certain similar characteristics and/or attributes. For example, two database servers operating in the data tier may run different instantiations of the same operating system (e.g., Linux™), or may have the same amount of Random Access Memory (RAM) (e.g., 96 gigabytes (GBs)). In the aforementioned example, the second database server may provide load balancing and/or redundancy to the first database server.

In a data center, load balancing distributes workloads across multiple computing entities and can optimize resource use, maximize throughput, minimize response time, and avoid overload of any single computing entity. In the above example, the workload assigned to the first database server may be distributed among the first and second database servers to provide load balancing. In addition, using multiple computing entities with load balancing instead of a single computing entity may increase reliability of the data center components through redundancy.

Redundancy involves the duplication of critical components (or functions) of a computing entity (or system) with the intention of increasing reliability of the system. In the above example, the second database server can be a duplicate of the first database server. If the first database server fails, the data center can rely on the second database server to serve a business critical application. Therefore, in the manner described above, heterogeneous computing entities in a data center can be bucketed and segregated to provide one or more different computing services and/or functionalities (e.g., to one or more applications and/or to one or more computing entities).

Given the complexity of a modern data center, monitoring and control of an IT business service can require bucketing (or grouping) and segregation of computing entities in the data center to ensure data availability, data center functionality, and the movement and scaling of data center components (e.g., computing entities within the data center). Knowledge and/or information regarding the connectivity relationships between these various data components is also required, for example, to accurately define a SLA.

Therefore, it can be helpful to represent, monitor, and control IT business services in a data center that is implemented using a multi-tier IT architecture. The ability to represent, monitor, and control IT business services is useful for, among other things, visualizing critical data center components across one or more data centers, SLA definition and management, operations required to maintain business continuity, and reporting on IT assets and IT business services across one or more data centers. Hence, as discussed above, the ability to optimize business continuity policies and procedures can be useful to an IT administrator and/or IT director of an organization.

FIG. 1A is a block diagram of a computing system. Computing device 10 includes a processor 20 and memory 30. As shown, computing device 10 is coupled to primary site 105 and secondary site 110. Computing device 10 can be any of a variety of different types of computing devices, including a server, personal computing device, laptop computer, net book, personal digital assistant, cellular phone, or the like.

Computing device 10 is coupled to primary site 105 through network 90. In this example, primary site 105 is a data center which includes nodes 70(1)-(N). Like computing device 10, nodes 70(1)-(N) can be any of a variety of different types of computing devices, including a server, personal computing device, laptop computer, net book, personal digital assistant, cellular phone, or the like. Computing device 10 is also coupled to secondary site 115 through network 90. Like primary site 105, secondary site 110, which can also be referred to as a disaster recovery site, is a data center which includes nodes 80(1)-(N). Like computing device 10 and nodes 70(1)-(N), nodes 80(1)-(N) can be any of a variety of different types of computing devices, including a server, personal computing device, laptop computer, net book, personal digital assistant, cellular phone, or the like.

A data center like primary site 105 is a facility used to house computing entities (e.g., computing systems or computing devices) and associated components such as storage systems (not shown). A data center like primary site 105 can assure the integrity and functionality of its hosted computer environment (e.g., by providing the advantages associated with redundancy and/or load-balancing as discussed above). A data center typically occupies one room of a building, one or more floors, or an entire building. However, it should be noted that a data center can also be spread out over two or more geographically distinct locations, and the computing components of the data center can be coupled to each other through a network. Because a data center can house multiple computing entities, a data center has the ability to take advantage of a multi-tier IT architecture in providing an IT business service.

FIG. 1B is a block diagram of a multi-tier IT architecture that is implemented in a data center (e.g., primary site 105) to provide an IT business service. Primary site 105 includes three tiers—presentation tier 115, business logic tier 140, and data tier 165. It should be noted that primary site 105 can include just one tier or more than three tiers and the number of tiers in primary site 105 should not be considering limiting in any manner. As noted above, each tier (also referred to as business service tier) is assigned to perform a different task (e.g., an IT business task) in the data center.

As shown in FIG. 1B, a business service tier is a logical grouping of computing entities, which are similar in terms of resource requirements, scale, availability criteria, interfaces, placement, etc., among other similarities. A business service tier such as presentation tier 115, business logic tier 140, and data tier 165 provide one or more distinct IT business services in terms of functionality—while still maintaining commonalities, and therefore, are able to be grouped together. For example, methods of grouping tiers can be based on but are not limited to: characteristics/types of servers and storage, connectivity and protection schemes, and heuristics and clustering of commonalities between such computing entities.

For example, computing entities in groupings such as business front end 120, API provider 125, and authentication gateway 130 can belong to the same network subnet, each computing entity can be a virtual machine, and/or each entity can run a web server. In the example shown in FIG. 1B, the computing entities in presentation tier 115 run web servers 135(1)-(10). Similarly, and in another example, database servers 185(1)-(8) in data tier 165 may run enterprise applications and databases (e.g., an Oracle database or a SQL database), may be connected to enterprise grade storage, may provide replication setup services, and may also apply data backup policies. In some embodiments, database servers 185(1)-(8) may also store snapshots of application and/or user data.

As shown in FIG. 1B, each tier can implement one or more business service components. For example, presentation tier 115 implements business front end 120, API provider 125, and authentication gateway 130 business service components. Business logic tier 140 implements transaction and cart 145, notification and reporting 150, and authentication 155 business service components. Similarly, data tier 165 implements transactions 170, catalog 175, and reporting and authentication 180 business service components. It should be noted that the configuration shown in FIG. 1B is an example, and several different configurations of one or more business service tiers each with one or more different components can be contemplated in one or more alternate embodiments.

A business service component is a functional unit of service which resides in a business tier (e.g., as shown in this example, does not span multiple tiers). The functional unit includes a redundant set of computing entities (e.g., web servers 135(1)-(10), application servers 160(1)-(7), and database servers 185(1)-(8)). These redundant set of computing entities together provide a single service to a consumer (e.g., a banking transaction service, an online shopping service, or a human resources related service, among others). One reason for implementing a business service component can be to provide redundancy for purposes of availability and load balancing in both predictive and reactive IT environments. In addition to heuristics and clustering of commonality and/or similarity between computing entities, a business service component can be identified by means of configuration.

Grouping of Computing Entities

For example, a business service component can be identified based on high availability configurations, backup policies, application configuration, load balancer configuration, and/or scale out configurations in cloud or virtualization platform management. For example, web servers 135(1)-135(5) in business front end 120 can be virtual machines which can be derived from a single golden image. In this example, dynamic provisioning configurations (e.g., puppet), network configurations (e.g., external, internal, etc.), presence of absence of data (e.g., the state of the virtual machines), and/or the provision of identical services can suggest grouping. Similarly, common dependencies (e.g., commonalities or similarities) of application servers 160(1)-(4) in business logic tier 140 can be determined based on configurations of failover clusters, internet protocol (IP) load balancers, and/or application service configurations (e.g., certain facilities can show a common dependency like a database).

In another example, commonalities between application servers 160(5)-(6) authentication 155 in business logic tier 140 can be determined based on IP load balancers, application service type, and/or others configurations which may indicate similarities between application servers hosting similar services. Similarly, commonalities between database servers 185(1)-(3) in data tier 165 can be based on the vendor of the database, the technology implemented by the database, and/or a zoning configuration (e.g., Vendor Credentialing Service (VCS), Real Application Cluster (RAC), Data Guard, etc.).

Once a business service component (e.g., authentication 155) has been detected, a minimum unit of functionality can be identified (e.g., to determine continuity). In some embodiments, the minimum unit of functionality can be a single instance of the computing entity (e.g., applications server 160(7)). In other embodiments, more than one instance of the computing entity can be required to provide a minimum unit of functionality.

The minimum unit of functionality can be represented by a minimum functional component requirement, which is the minimum resource requirement for a business service component. The minimum functional component requirement can, in some embodiments, represent a Single Point of Failure (SPF) of the data center. In addition, a minimum acceptable component requirement can also be established. The minimum acceptable component requirement can be the level of redundancy required to deem the business service component as providing acceptable functionality (e.g., according to an IT administrator and/or IT director of an organization). In one embodiment, functionality below the minimum acceptable component requirement may require remediation.

In one or more embodiments, the computing entities in primary site 105 are dynamic in nature. Therefore, the minimum functional component requirement and the minimum acceptable component requirement can be applied at the site level (e.g., these requirements may be different for primary site 105, secondary site 110, and/or for a cloud-based data center). The business service component is also the unit at which policies can be defined and enforced. Such policies can be categorized based on availability, primary storage, backup requirements, etc. A common policy can also be enforced for a given business service component (e.g., a common policy can be made application to web servers 135(6)-(8) in API provider 125).

In other embodiments, at the business service component level, grouping of computing entities and policy feedback can be available as application programming interfaces (APIs), which can be used by other computing and/or software products. In this example, recommendations and violations (e.g., of a policy) can also be generated for standardization and for reporting purposes (e.g., to an IT administrator and/or IT director of an organization).

Moving a Business Service Component

It will be appreciated that disaster recovery (DR) capability can be maintained at the business service component level. In some embodiments, a business service component can include attributes such as location and independence, among others. In this example, location indicates the current seat of the business service component (e.g., a site tag). Independence indicates that the functionality of the business service component is independent of the location of the business service component. Therefore, a business service component such as authentication 155 can move across data centers (or sites) without affecting the functionality of the entire service being provided by that data center. A factor of independence is degradation, which indicates degraded functionality of the business service (e.g., the authentication service being provided by the authentication business service component authentication 155) if the business service component is not co-located with other business service components in the business service (e.g., transaction and cart 145 and/or notification and reporting 150).

Figures 2A, 2B:
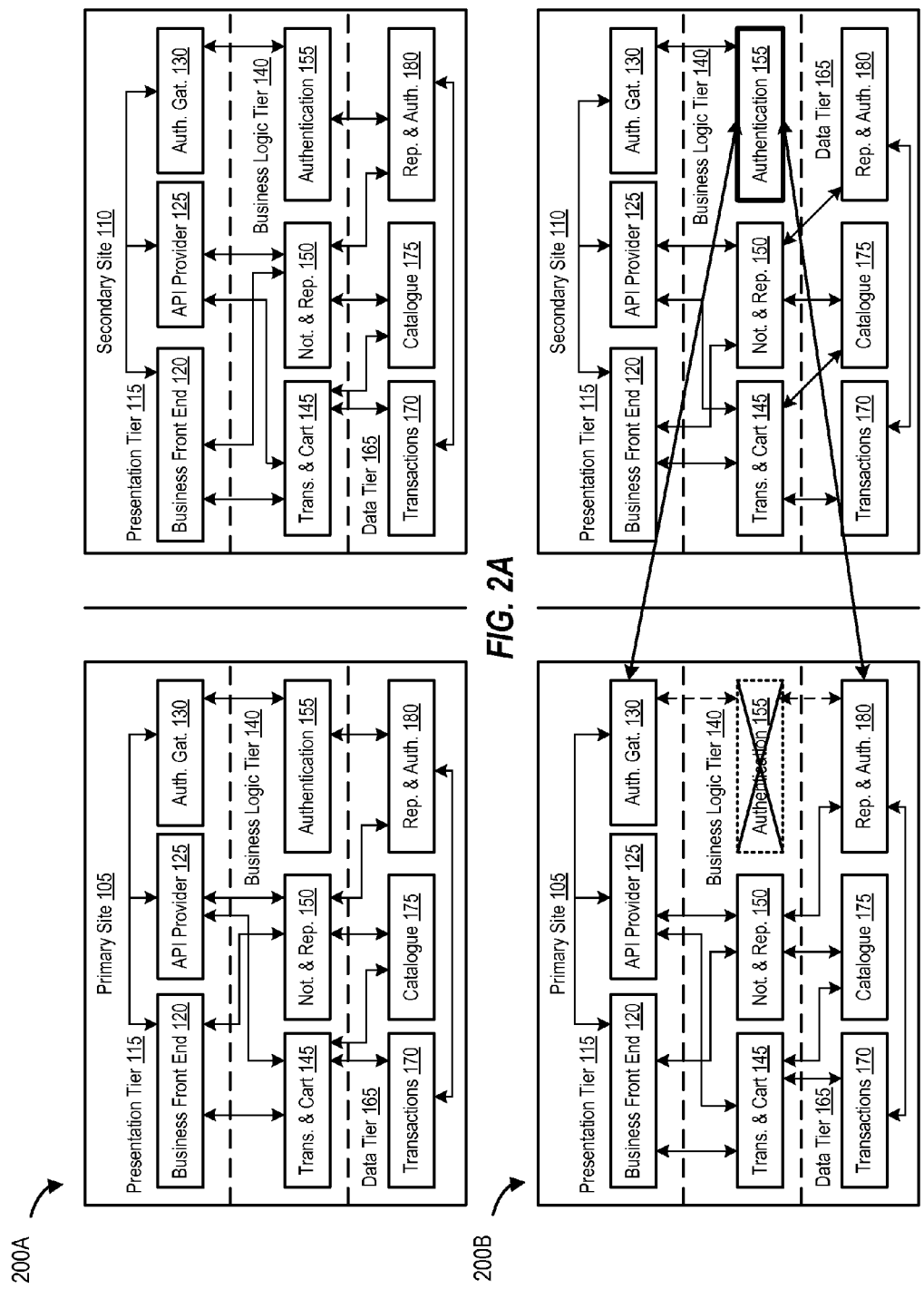
FIG. 2A is a block diagram of a primary site and a secondary site that provide an IT business service, according to one embodiment of the present invention.
FIG. 2B is a block diagram of a secondary site which provides a disaster recovery service to a primary site, according to one embodiment of the present invention.

FIG. 2A is a block diagram of business service components in primary site 105 and secondary site 110. In this example, secondary site 110 is a disaster recovery site of primary site 105 and is a mirror image of primary site 105 (e.g., an exact replica). FIG. 2B is a block diagram of a business service component that moves from primary site 105 to secondary site 110. In this example, authentication 155 can move from primary site 105 to secondary site 110 (e.g., upon failure of application server 160(7)) while only slightly degrading the functionality of the business service (e.g., authentication 155). For example, the slight degradation can be caused due to the additional time required to access data from another application server on secondary site 110 and serve an application executing on primary site 105 (e.g., via a network).

Therefore, the minimum functional component requirement and the minimum acceptable component requirement can be used to define a business service as an ordered collection of business service tiers which are aware of the dynamic nature of the business service components and their dependencies. As discussed above, defining SLAs, operations for maintaining continuity in the event of disaster (or downtime), and modeling and reporting for compliance purposes can be enabled at the business service level.

Discovering Characteristics of Computing Entities

In one or more embodiments, business services can be represented as templates. Representing business services as a template can be performed using discovery, analytics (e.g., using heuristics), and/or user input. For example, VIRTUAL BUSINESS SERVICE (VBS) and VERITAS OPERATIONS MANAGER (VOM) developed by SYMANTEC CORPORATION of Mountain View, Calif. can be enabled to configure and represent a business service component through discovery (e.g., using device detection) and/or via user input. Similarly, VOM and/or VBS can be enabled to define dependencies between business service components.

As discussed above, the creation of a template can be performed through discovery (e.g., application discovery). Host-based and remote mechanisms (e.g., Telnet) in addition to API based discovery (e.g., VMware®'s vSphere) can be used for the purpose of business service identification. In some embodiments, a network can be crawled to discover user-selected computing entities. The configuration of a data center can also be used to detect applications running on the data center, as well as the connectivity and/or dependency between the data center's components. In one embodiment, heuristics can be used to achieve the same result. In another embodiment, a set of application discovery templates can be used to represent, monitor, and start and/or stop a detected application. Similarly, functional groupings such as virtual machines from the same golden image, computing entities in the same server cluster, file systems of different computing entities protected by the same backup policy, and/or IP load balancing configurations, etc. can also be discovered using the above methodologies.

In some embodiments, a user input can provide one or more components of the business service. For example, if web server 135(1) is a virtual machine, a user input can include, for example, the name of the golden image from which the virtual machine is spawned, and the name of the computing entity hosting an instance of the web server. From this information, deductions of active virtual machines, and other computing entities using the web server and their connectivity/dependency on certain database servers on which they are configured can be made. Therefore, once a business service has been identified, the business service can be represented in its entirety as templates. For example, one or more business services operating in a data center such as primary site 105 can be represented as a minimum functional template and/or a minimum acceptable template.

Minimum Functional Template

Figure 3A:
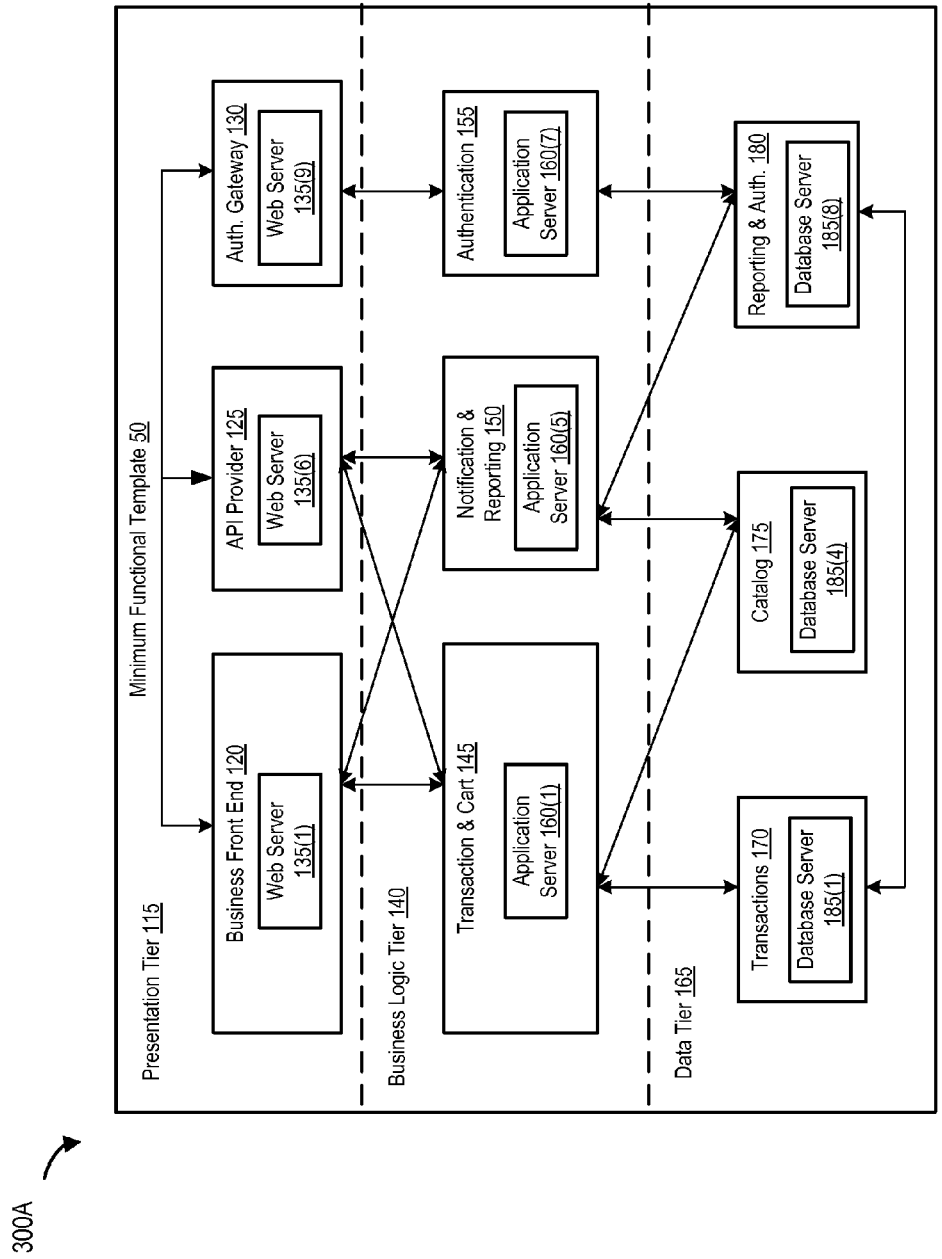
FIG. 3A is a block diagram of a minimum functional template, according to one embodiment of the present invention.

FIG. 3A is a block diagram that illustrates a minimum functional template. Minimum functional template 50 is a representation of one or more instances of a computing entity that provides minimum functionality to primary site 105. Minimum functional template 50 can be used to identify an instance of a business service. In one embodiment, a representation of units of computing entities and the relationships (or dependencies) between the units of computing entities in primary site 105 is compared with minimum functional template 50. A determination is then made if the representation meets a threshold based on the result of the comparing. The result of the determining is then provided, for example, to a user (e.g., an IT administrator and/or an IT director of an organization). The threshold can be established by a configuration of a disaster recovery site, a service level agreement, or a configuration drift level.

FIG. 4A illustrates comparing a representation of computing entities and their relationships (also referred to as dependencies or connectivity relationships) in a primary site (e.g., primary site 105) to a minimum functional template (e.g., minimum functional template 50). Such a comparison can be performed using comparison module 40, which can be implemented in a computing device (e.g., such as computing device 10 of FIG. 1A). As discussed above, a user input from a user can include a representation of business services in a data center. The representation can be clustered into one or more groups (as shown in FIG. 4A). The one or more groups (e.g., logical groupings) can represent a minimum functional operating state of primary site 105, and the minimum functional operating state of primary site 105 can be represented by minimum functional template 50 (as shown in FIG. 3A). In some embodiments, the representation of the minimum functional operating state of primary site 105 created by the clustering can include representing the units of computing entities in a graph format using one or more vertices.

In some embodiments, the clustering is based on one or more similar characteristics shared between two or more units of computing entities in primary site 105 and can be performed using a clustering algorithm which implements hierarchical clustering. In this example, such similar characteristics can include similar (or identical) hardware and/or software characteristics (or attributes) of the computing entities, or, according to other embodiments, a range of similar hardware and/or software characteristics (or attributes) shared by two or more computing entities. After minimum functional template 50 is created, minimum functional template 50 can be stored on computing device 10. It will be appreciated that minimum functional template 50 can be exported and applied to other data centers such as secondary site 110 or any other data center and/or site.

Minimum Acceptable Template

Figure 3B:
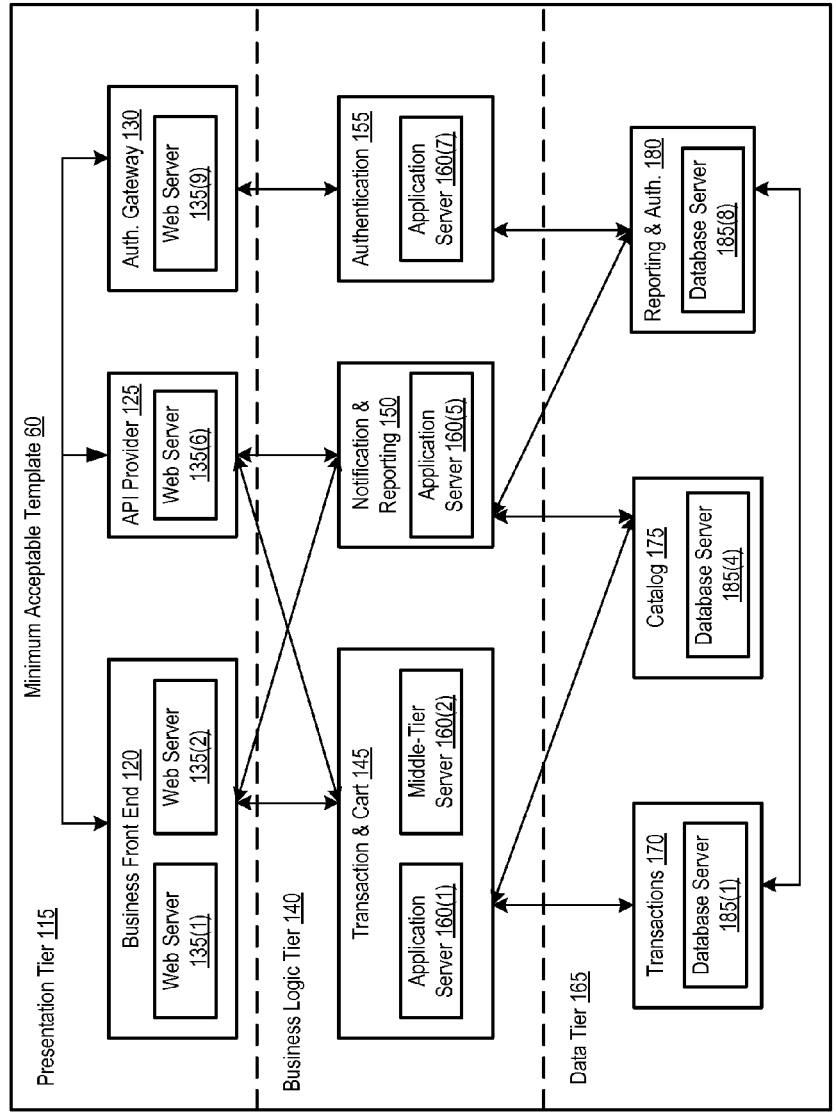
FIG. 3B is a block diagram of a minimum acceptable template, according to one embodiment of the present invention.

FIG. 3B is a block diagram that illustrates a minimum acceptable template. As noted above, after minimum functional template 50 is created, a user is notified of the minimum functional operating state of primary state 105 as represented by minimum functional template 50. At this juncture (after being notified of the minimum functional operating state), and in some embodiments, the user can provide another input which indicates a minimum acceptable operating state of primary site 105. For example, the minimum acceptable operate state can include an IT director's requirement, assessment, and/or expectation of computing entities (and their dependencies) that may be needed for a data center to function smoothly (e.g., without failure, without approaching failure, or without any and/or minimum degradation, etc.).

For instance, an IT director may require two application servers 160(1) and 160(2) for transaction and cart 145 business service component because of high user demand for transaction and cart business services (e.g., during a busy holiday shopping season). In this example, the second application server 160(2) may provide load balancing and/or redundancy based advantages to the first application server 160(2). In this manner, the user (e.g., the IT director) can provide an input specifying a minimum acceptable operating state that he or she desires for his or her data center (e.g., primary site 105).

In one embodiment, after the user specifies a minimum acceptable operating state, a minimum acceptable template is created based on the minimum acceptable operating state. FIG. 4B illustrates comparing a representation of computing entities and their relationships (also referred to as dependencies or connectivity relationships) in a primary site (e.g., primary site 105) to a minimum acceptable template (e.g., minimum acceptable template 60). Such a comparison can be performed using comparison module 40, which can be implemented in a computing device (e.g., such as computing device 10 of FIG. 1A).

As discussed above, a user input from a user can include a minimum acceptable operating state. The representation can be clustered into one or more groups (as shown in FIG. 4B). The one or more groups (e.g., logical groupings based on commonalities and/or similarities of characteristics and/or attributes) can represent a minimum acceptable operating state of primary site 105, and the minimum functional operating state of primary site 105 can be represented by minimum functional template 60 (as shown in FIG. 3B). Minimum acceptable template 60 is a representation of the minimum acceptable operating state of the primary site, and like minimum functional template 50, can be stored on a computing device.

FIG. 3C and FIG. 3D are block diagrams that illustrate representations of minimum functional template 50 (as shown in FIG. 3C) and minimum acceptable template 60 (as shown in FIG. 3D), respectively. These representation can be used to evaluate a representation of a data center (e.g., a representation of primary site 105 as shown in FIG. 4A, or a representation of secondary site 110 as shown in FIG. 4B) by performing a matching and/or comparison operating between the two representations (e.g., between a representation of minimum acceptable template 60 as shown in FIG. 3D and a representation of secondary site 110 as shown in FIG. 4B).

It will be appreciated that several other types of templates can be constructed and stored (e.g., in computing device 10). For example, a high availability template can be created from a representation of a data center which can be used to evaluate a representation of another data center for elimination of single points of failure, reliable crossover, and detecting of failures as they occur. In another example, an optimization template can also be constructed and stored which can be used to evaluate whether another data center is operating in an optimized state (e.g., with maximum load balancing and/or redundancy based provisioning).

Processes for Evaluating Systems

Figure 5A:
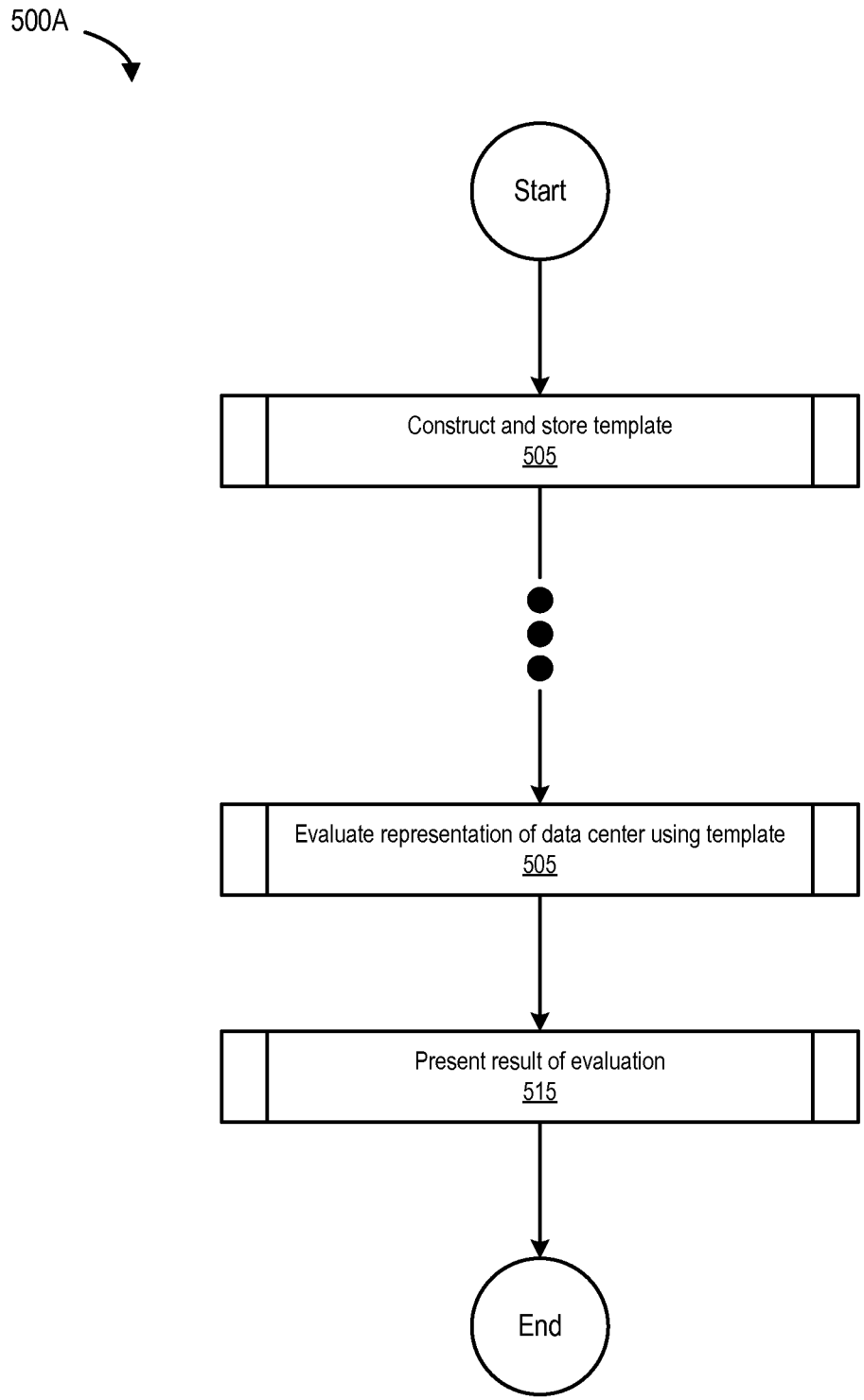
FIG. 5A is a flowchart of a process for evaluating a representation of a data center using a template, according to one embodiment of the present invention.

FIG. 5A is a flowchart that illustrates a process for evaluating a representation of a data center using a template. As noted above, several different types of templates (e.g., a high availability template, a minimum functional template, a minimum acceptable template, an optimization template, etc.) can be used to evaluate the functionality (or operating state) of a data center by performing a matching and/or comparison operation. The process begins at 505 by constructing and storing a template (e.g., in a computing device). One way in which a template can be constructed is by performing clustering (see FIG. 6A). In some embodiments, a template can be received from a user (e.g., through a user input), or can be obtained from another data center and/or computing entity.

Once a template is obtained, the process, at 505, evaluates a representation of a data center (e.g., a representation of primary site 105 or a representation of secondary site 110 as shown in FIG. 4A and FIG. 4B) using the template (e.g., a representation of minimum functional template 50, or a representation of minimum acceptable template 60, as shown in FIG. 3C and FIG. 3D). The process ends at 515 by presenting the result of the evaluation (e.g., to a user, IT director, etc.). In some embodiments, the result can be presented in the form of a report, or even graphically using a graphical user interface (GUI).

Figure 5B:
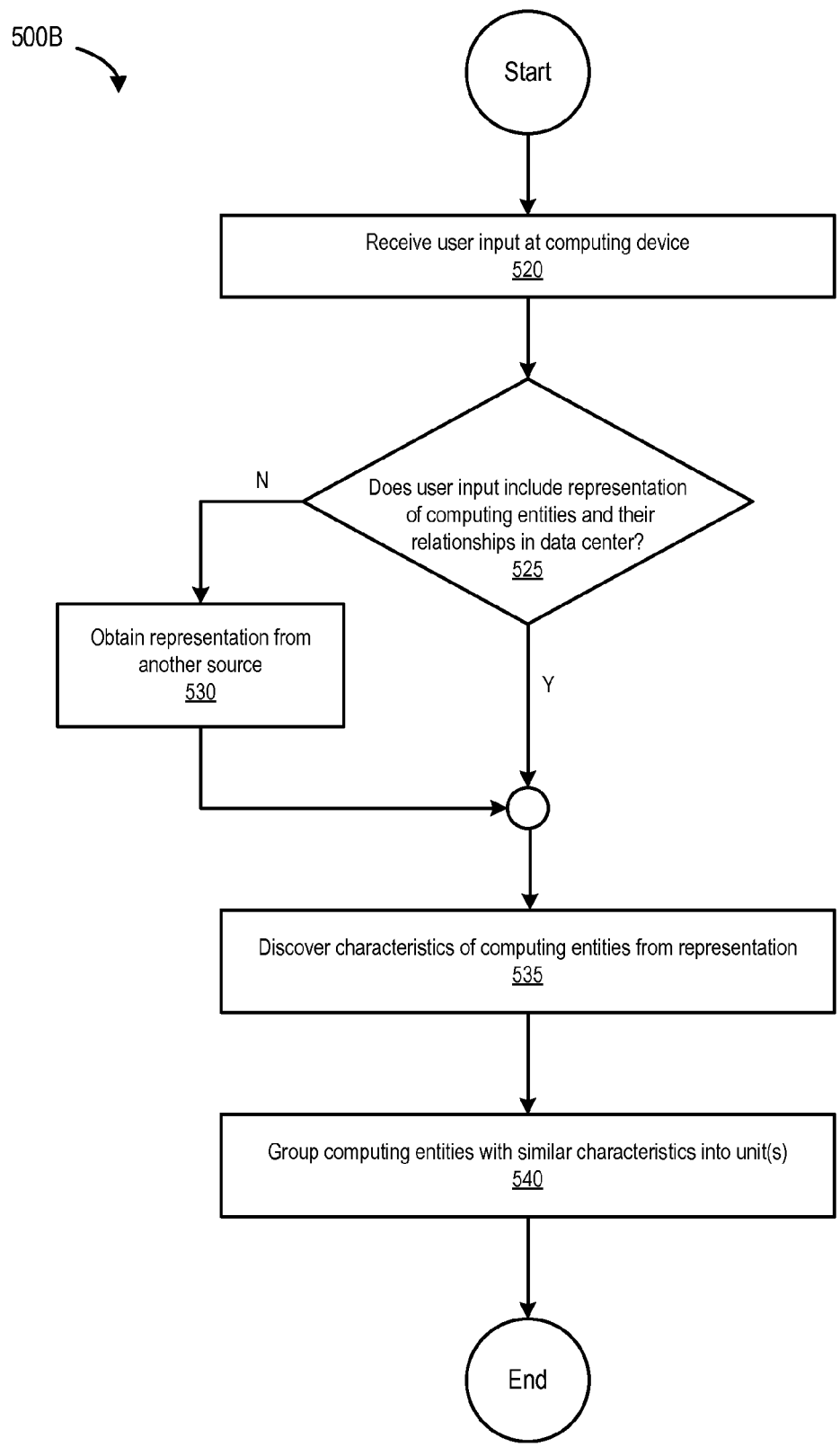
FIG. 5B is a flowchart of a process for clustering computing entities with similar characteristics, according to one embodiment of the present invention.

FIG. 5B is a flowchart that illustrates a process of grouping computing entities into one or more units, according to one embodiment of the present invention. The process begins at 520 by receiving a user input at a computing device (e.g., computing device 10). The user input can include a representation of a data center noting the various computing entities in the data center, their logical groupings (e.g., into business service components), as well as the dependencies between such business service components (as shown in FIGS. 1B, 2A, and 2B). In some embodiments, the user input can include a location from which a representation of a data center (to be evaluated) can be obtained (e.g., from another data center, a storage device, another computing entity, another user, etc.). At 525, the process determines if the user input includes a representation of computing entities and their relationships in a data center (e.g., as shown in FIG. 4A). In some embodiments, the process can also determine if the user input includes a representation of computing entities that are grouped into one or more business service components, and can also determine the dependency relationships between such business service components (e.g., the dependency relationship between business front end 120 and notification and reporting 150 as shown in FIG. 1B).

If the user input does not include the representation, at 530, the process obtains the representation from another source (e.g., from a storage device coupled to computing device 10 (not shown), or from another user), or by using another method (e.g., by discovery, heuristics, etc. as discussed above). At 535, the process discovers (similar) characteristics and/or attributes of the computing entities in the data center (e.g., primary site 105) using the received representation (or by discovering such attributes automatically using device discovery). The process ends at 540 by grouping computing entities with similar characteristics (or within a range of similar characteristics) into one or more units.

Figure 6A:
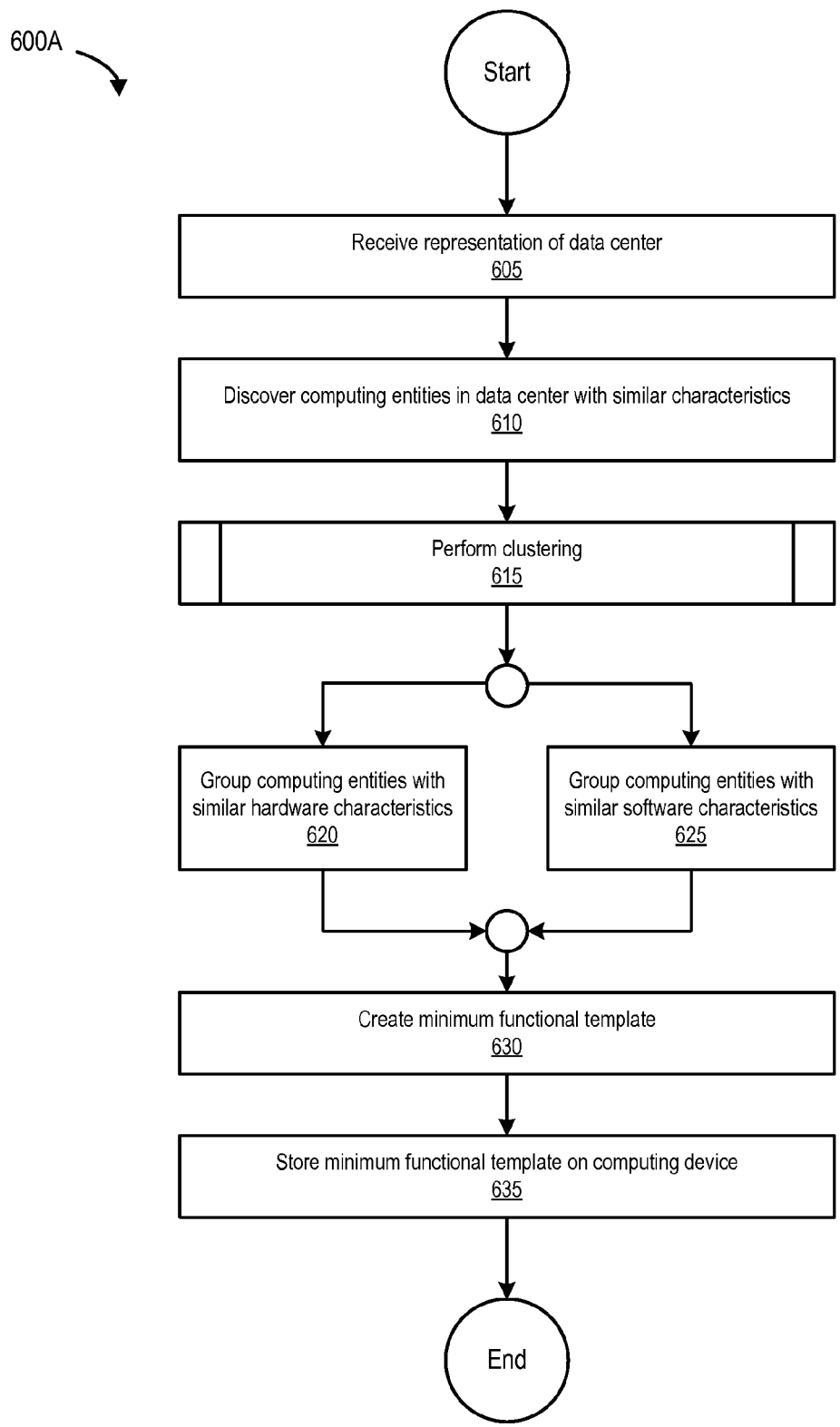
FIG. 6A is a flowchart of a process for creating a minimum functional template, according to one embodiment of the prevent invention.

FIG. 6A is a flowchart that illustrates a process for creating a minimum functional template, according to one embodiment of the present invention. The process begins at 605 by generating a representation of a data center (e.g., primary site 105). At 610, the process discovers computing entities in the data center with similar characteristics, and at 615, performs clustering (e.g., logical grouping based on similar characteristics). At 620 and 625 respectively, the process clusters computing entities with similar (or a range of similar) hardware characteristics and software characteristics. At 630, the process creates the minimum functional template, and at 635, stores the minimum functional template on a computing device (e.g., for re-use and/or re-deployment on another data center and/or site, for instance, secondary site 110).

Figure 6B:
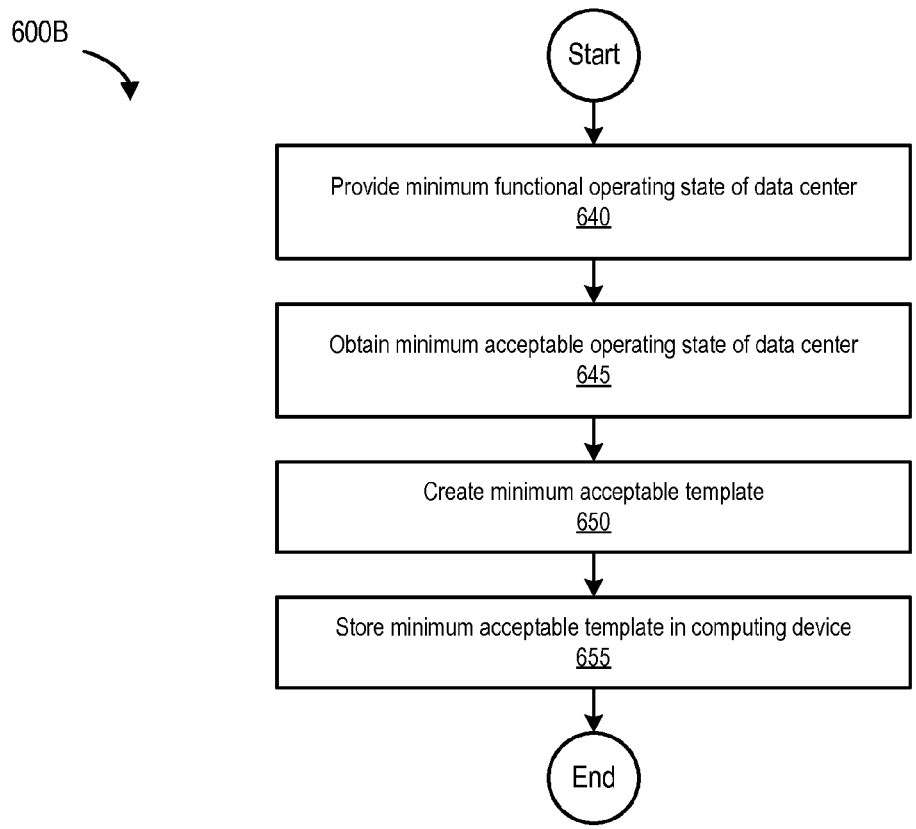
FIG. 6B is a flowchart of a process for creating a minimum acceptable template, according to one embodiment of the present invention.

FIG. 6B is a flowchart that illustrates a process for creating a minimum acceptable template, according to one embodiment of the present invention. The process begins at 640 by providing the minimum functional operating state of a data center (e.g., as represented by minimum functional template 50) to a user. At 645, the process obtains via discovery (or receives via user input) a minimum acceptable operating state (or requirement, assessment, expectation, etc.) of the data center. At 650, the process creates a minimum acceptable template (e.g., minimum acceptable template 60), and at 655, stores the minimum acceptable template in a computing device (e.g., for re-use and/or re-deployment).

Figure 6C:
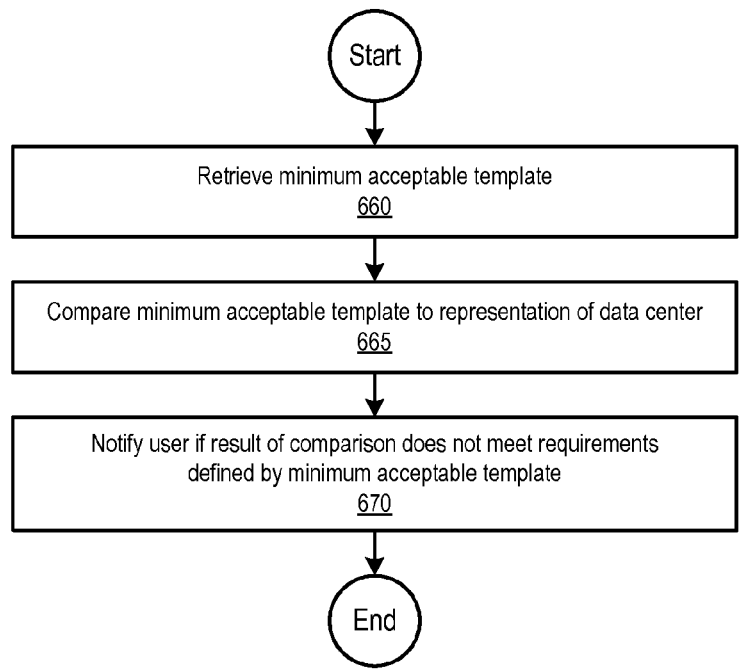
FIG. 6C is a flowchart of a process for notifying a user, according to one embodiment of the present invention.

FIG. 6C is a flowchart that illustrates a process for comparing the minimum acceptable template to a representation of a data center (e.g., representation of secondary site 410(2) of FIG. 4B). The process begins at 660 by retrieving a minimum acceptable template (e.g., from a user, from a storage device, from another data center, etc.). At 665, the process compares the minimum acceptable template to a representation of a data center (e.g., by using comparison module 40). The process ends at 670 by notifying a user (e.g., an IT director) if the result of the comparison does not match or exceed the minimum acceptable template. In some embodiments, the comparison can be performed by comparing the representation of a secondary site (e.g., representation of secondary site 410(1) or 410(2) to minimum acceptable template 60. As noted above, if the representation if the minimum acceptable operating state is performed using vertices, in one embodiment, the process can determine if the representation and the minimum acceptable template are isomorphic (e.g., if a vertex in the representation can be repositioned and is identical to a corresponding vertex in the minimum acceptable template). Although methodologies of graph theory can be used for comparison in some embodiments, other comparison methodologies to compare a representation of a data center and a minimum acceptable template are also contemplated in other embodiments.

It will be appreciated that in some embodiments, a weight can be assigned to one or more relationships between computing entities in a data center (e.g., primary site 105 or secondary site 110). For example, if a first web server has more RAM than a second web server, the first web server can be assigned a greater weight than the second web server. In this manner, the quality of the relationship of the first web server with other computing entities can be afforded greater importance than the quality of the relationship of the second web server when formulating minimum functional template 10 and/or minimum acceptable template 60.

It should also be noted that although the above discussed comparison and evaluation operations are discussed in terms of the minimum acceptable template, in one or more embodiments, the comparison and evaluation operations can be performed using one or more of several other templates such a high availability template, an optimization template, a minimum functional template, etc.

Disaster Recovery Site Evaluation

Another aspect of business service identification is disaster recovery (DR) configuration (e.g., of a secondary site or a site in the cloud). In some embodiments, a DR configuration can be identified by detecting an explicit DR configuration (e.g., by using a global configuration object (GCO)), or by detecting an implicit DR configuration (e.g., replicated DR site). In other embodiments, a user can specifically identify a business service or another DR site (e.g., a DR site implemented in the cloud). Logical groupings of computing entities in a DR site can be created by detecting, structurally and functionally, if the discovered or user-identified DR site is capable of providing an expected, required, and/or anticipated service. In addition, logical groupings can also be created by detecting deficiencies of one or more computing entities (in the DR site and/or data center) during the process of creating a minimum acceptable template for a disaster recovery site.

Figure 7A:
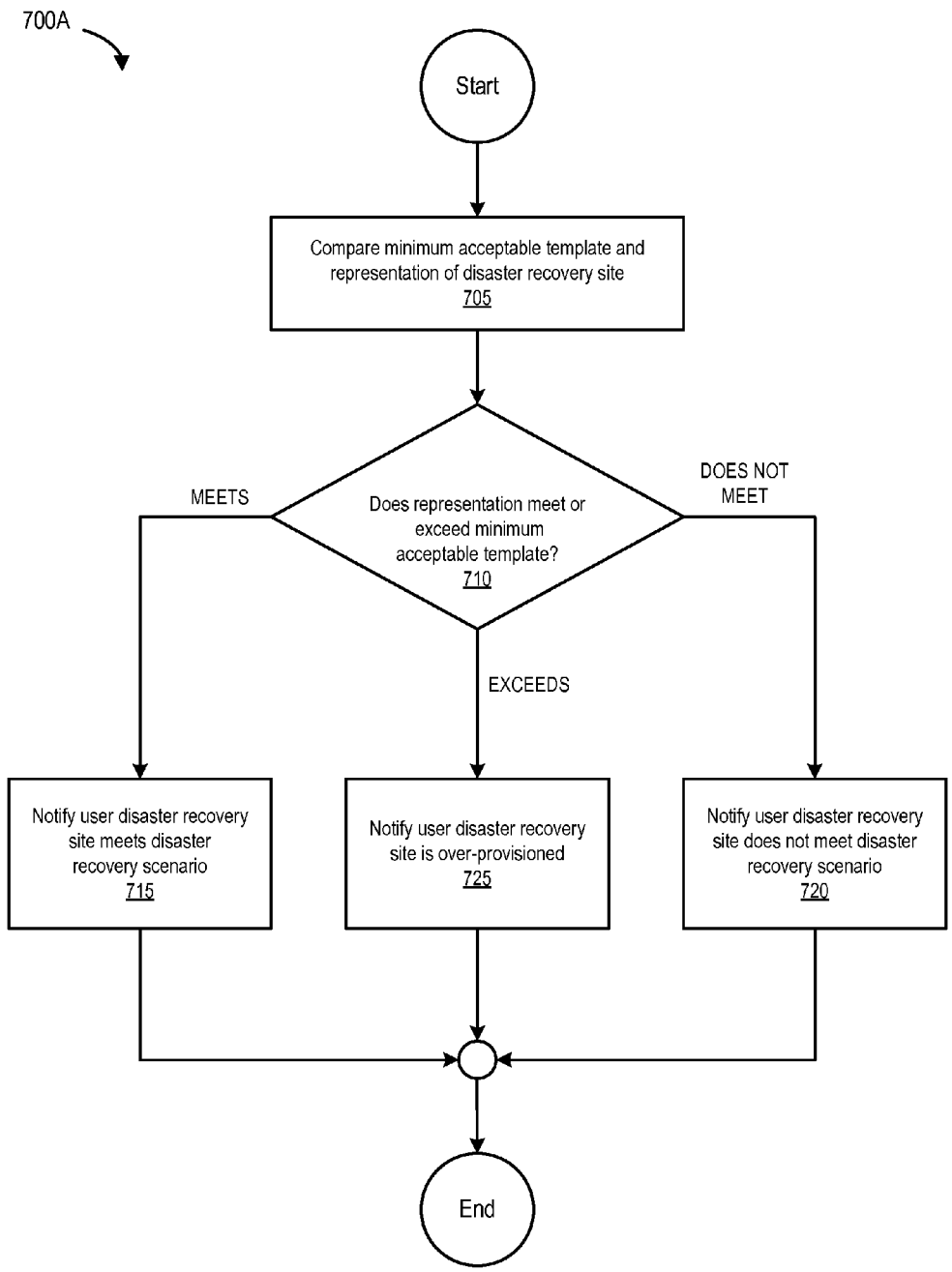
FIG. 7A is a flowchart of a process for verifying a disaster recovery scenario, according to one embodiment of the prevent invention.

FIG. 7A is a flowchart that illustrates a process for comparing a minimum acceptable template and a representation of a disaster recovery site, according to one embodiment of the present invention. The process begins at 705 by comparing minimum acceptable template 60 to a representation of a DR site (e.g., representation of secondary site 410(2) as shown in FIG. 4B). At 710, the process determines, based on the comparison (or matching), if the representation meets or exceeds the minimum acceptable template. If the representation meets the minimum acceptable template, at 715, the process notifies a user that the given DR site meets a DR scenario (e.g., a DR scenario established by an IT director is sufficient). If the representation does not meet the minimum acceptable template (e.g., the representation is greater than the minimum acceptable template), the process, at 720, notifies the user that the DR site does not meet the DR scenario. However, if the representation exceeds the minimum acceptable template, the process, at 725 notifies (e.g., using notification 415(2) as shown in FIG. 4B) the user that the DR site may be over-provisioned.

In some embodiments, a comparison (or matching) result that a representation of a data center does not meet the minimum acceptable template could indicate that the DR site is under-provisioned. For example, the minimum acceptable template could indicate a requirement of three web servers for each business service component (e.g., for redundancy or load balancing), but the DR site may have been provisioned with only two web servers for each business service component. This information can be used by an IT director to make appropriate adjustments to the DR site (e.g., by adding an additional web server to each business service component grouping on the DR site to provide the required redundancy). Similarly, information based on the comparison or matching can be used to increase, decrease, or maintain the number of computing entities and/or the connectivity relationship (e.g., dependencies) between such computing entities on a DR site.

Service Level Agreement Evaluation

A Service Level Agreement (SLA) is a part of a service contract where one or more services (e.g., an IT business service and its parameters) are formally defined. In some embodiments, managing SLAs involves detecting a current operating state of a business service and defining acceptable levels of functionality and infrastructure availability (e.g., the number of computing entities and their connectivity and/or dependency relationships). Managing a SLA also involves reporting on future violations of the SLA and providing workflows (e.g., to an IT director) to remediate the violations.

Implementing a SLA in a data center involves discovering configurations of both hardware (e.g., server configurations, network and storage connectivity, storage arrays, etc.) and software (e.g., replication schemes, backup policies, etc.) computing entities supporting an application and/or business service in the data center. A combination of the above factors can be used to create a SLA template. In one embodiment, a SLA can be normalized at the business service component level to reflect the expectation of an IT director at the business service level (e.g., a SLA for data tier 165 running database servers can be different than a SLA for presentation tier 115 running virtual machines as web servers). In some embodiments, the current operating state of the business service can be modeled using minimum acceptable template 60 along with SLAs for various business service tiers by generating a list of critical computing entities and a list of critical relationships between the computing entities.

Figure 7B:
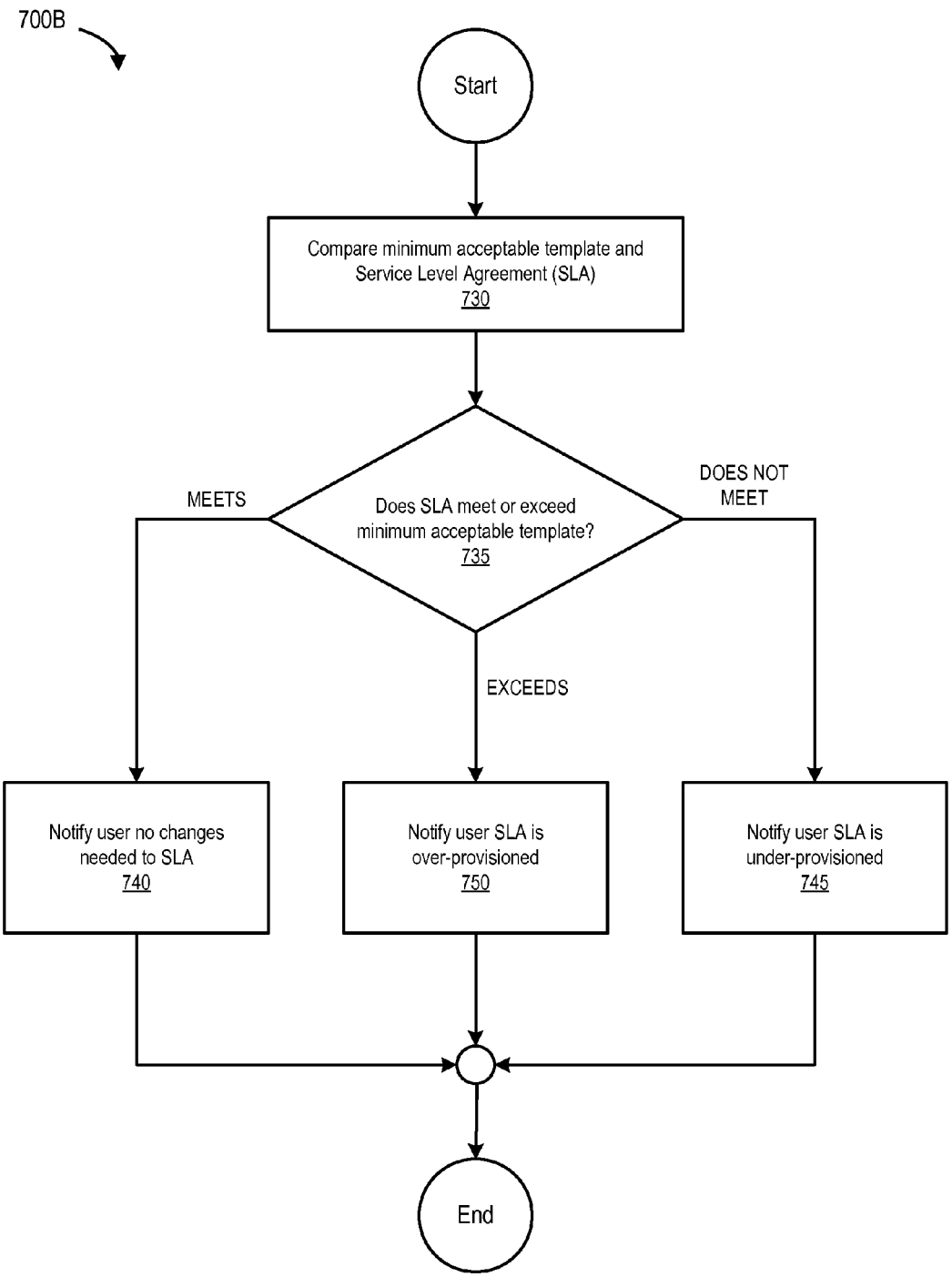
FIG. 7B is a flowchart of a process for verifying a Service Level Agreement (SLA), according to one embodiment of the present invention.

Comparing a SLA to a minimum acceptable template can be useful to identify the need for IT business continuity remediation plans. FIG. 7B is a flowchart that illustrates a process for comparing a minimum acceptable template to a SLA, according to one embodiment of the present invention. The process begins at 730 by comparing (or matching) a minimum acceptable template (e.g., minimum acceptable template 60) to a SLA. At 735, the process determines if the SLA meets or exceeds (the requirements of) the minimum acceptable template. If the SLA meets the minimum acceptable template, the process at 740, notifies a user that no changes are required to the SLA (or to the configuration of the data center and its computing entities and their relationships).

If the SLA does not meet the minimum acceptable template, the process at 745, notifies the user that the SLA may be under-provisioned (and may have to be updated to reflect the current operating state of the data center). In some embodiments, an under-provisioned SLA may indicate a SLA violation. However, if the SLA exceeds the minimum acceptable template, the process at 750, notifies the user that the SLA is over-provisioned (or that no action may need to be taken as there may be no immediate risk of a SLA violation).

Configuration Drift Evaluation

In the context of a data center, configuration drift refers to the configuration of computing entities (or their relationships/dependencies) drifting from a pre-established definition or standard (e.g., a standard defined in a SLA or minimum acceptable template 60). Therefore, comparison of a minimum acceptable template to a configuration drift level can be helpful to determine if a data center is operating in a degraded mode. In some embodiments, the minimum acceptable template (or any other template) can be compared to a range of configuration drift levels (e.g., as determined by an IT director).

Figure 7C:
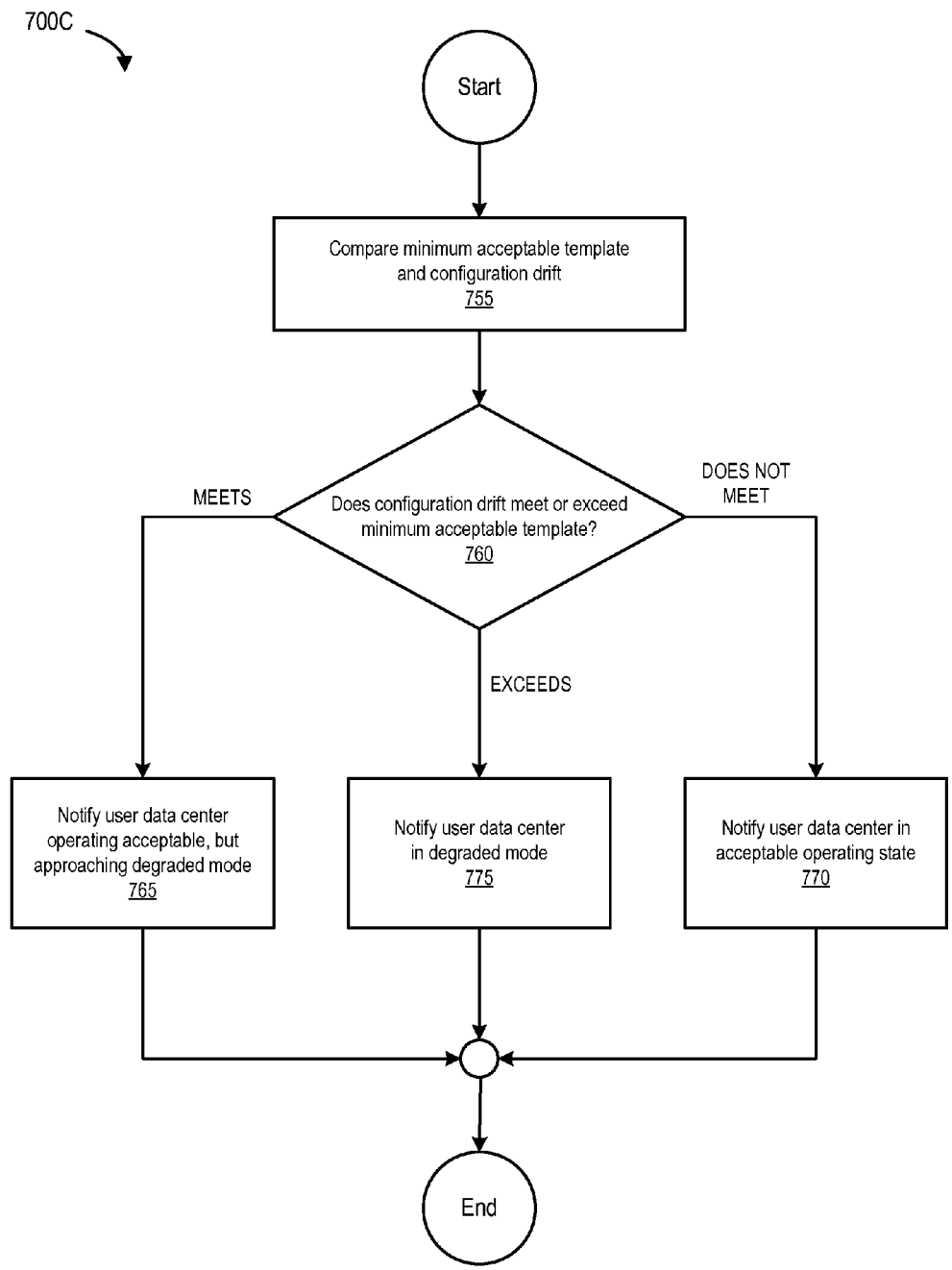
FIG. 7C if a flowchart of a process for verifying a configuration drift level, according to one embodiment of the prevent invention.

FIG. 7C is a flowchart illustrating a process for comparing a minimum acceptable template and a configuration drift level of a data center, according to one embodiment of the present invention. The process begins at 755 by comparing a minimum acceptable template to a configuration drift level of a data center. In this example, a configuration drift level can be indicated by a user (e.g., an IT director) or can be measured based on whether a SLA is violated, or not violated (as shown in FIG. 7B). At 760, the process determines if the configuration drift level meets or exceeds the minimum acceptable template. If the configuration drift level meets the minimum acceptable template, the process at 765, notifies a user that the data center operation is acceptable, but the data center is approaching a degraded mode (or degraded operating state).

In some embodiments, a degraded operating state may require the user to adjust or fine tune the minimum acceptable operating state of the data center, and thus, the minimum acceptable template (e.g., by increasing the number of provisioned computing entities for additional redundancy or load balancing). If the configuration drift level does not meet the minimum acceptable template, the process at 770, notifies the user that the data center is in an acceptable operating state (e.g., there is no immediate risk of SLA violation). However, if the configuration drift level exceeds the minimum acceptable template, the process at 775, notifies the user the data center is operating in a degraded mode (e.g., there may be a risk of SLA violation if the configuration drift level rises).

In some embodiments, comparing a representation of a data center to a minimum acceptable template can provide an IT director of an organization (or any user of the data center) the ability to take over a business application, a group of business applications, IT assets, or part of or an entire data center in case of a disaster scenario (e.g., by immediately serving a business critical application entirely from an appropriately provisioned DR site). In other embodiments, an application (e.g., a critical business application) can be migrated to another data center or site based on the comparison.

Example Computing Environment

Figure 8:
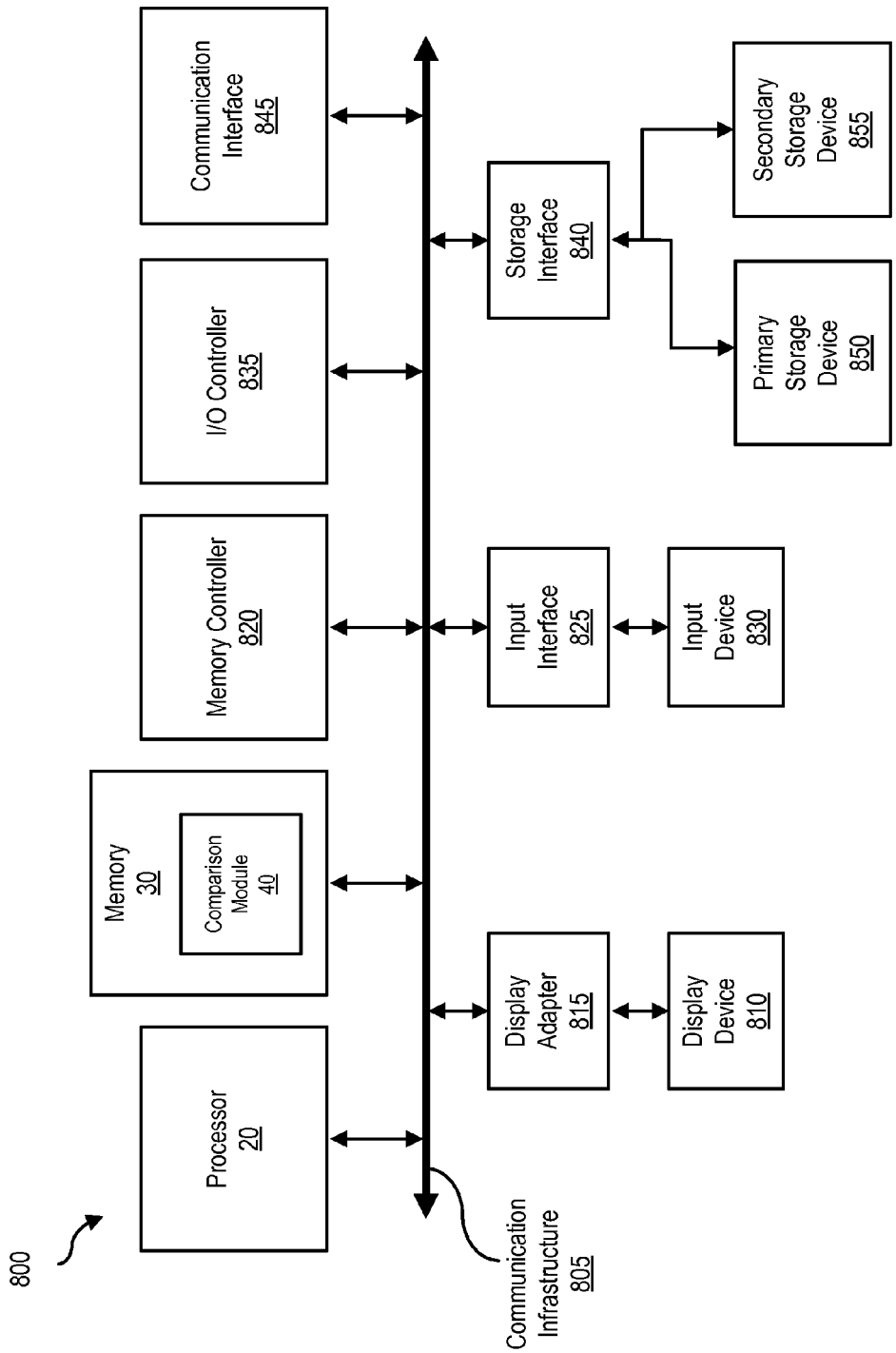
FIG. 8 is a block diagram of a computing device, illustrating how a comparison module can be implemented in software, according to one embodiment of the present invention.

FIG. 8 is a block diagram of a computing system 800 capable of implementing computing device 10 as described above. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 20 and a memory 30. By executing the software that implements computing device 10, computing system 800 becomes a special purpose computing device that is configured to perform business continuity optimization.

Processor 20 generally represents any type or form of processing unit capable of processing data or interpreting and executing instructions. In certain embodiments, processor 20 may receive instructions from a software application or module. These instructions may cause processor 20 to perform the functions of one or more of the embodiments described and/or illustrated herein. For example, processor 20 may perform and/or be a means for performing all or some of the operations described herein. Processor 20 may also perform and/or be a means for performing any other operations, methods, or processes described and/or illustrated herein.

Memory 30 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a modifiable volume snapshot operation may be loaded into memory 30.

In certain embodiments, computing system 800 may also include one or more components or elements in addition to processor 20 and memory 30. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 20, memory 30, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 20, memory 30, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG., computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include a primary storage device 850 and a secondary storage device 855 coupled to communication infrastructure 805 via a storage interface 840. Primary storage device 850 and secondary storage device 855 generally represent any type or form of storage devices or mediums capable of storing data and/or other computer-readable instructions. For example, primary storage device 850 and secondary storage device 855 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between primary storage device 850, secondary storage device 855, and other components of computing system 800.

In certain embodiments, primary storage device 850 and secondary storage device 855 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Primary storage device 850 and secondary storage device 855 may also include other similar structures or devices for allowing computer software, data, or other computer-readable instructions to be loaded into computing system 800. For example, primary storage device 850 and secondary storage device 855 may be configured to read and write software, data, or other computer-readable information. Primary storage device 850 and secondary storage device 855 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 30 and/or various portions of primary storage 850. When executed by processor 20, a computer program loaded into computing system 800 may cause processor 20 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
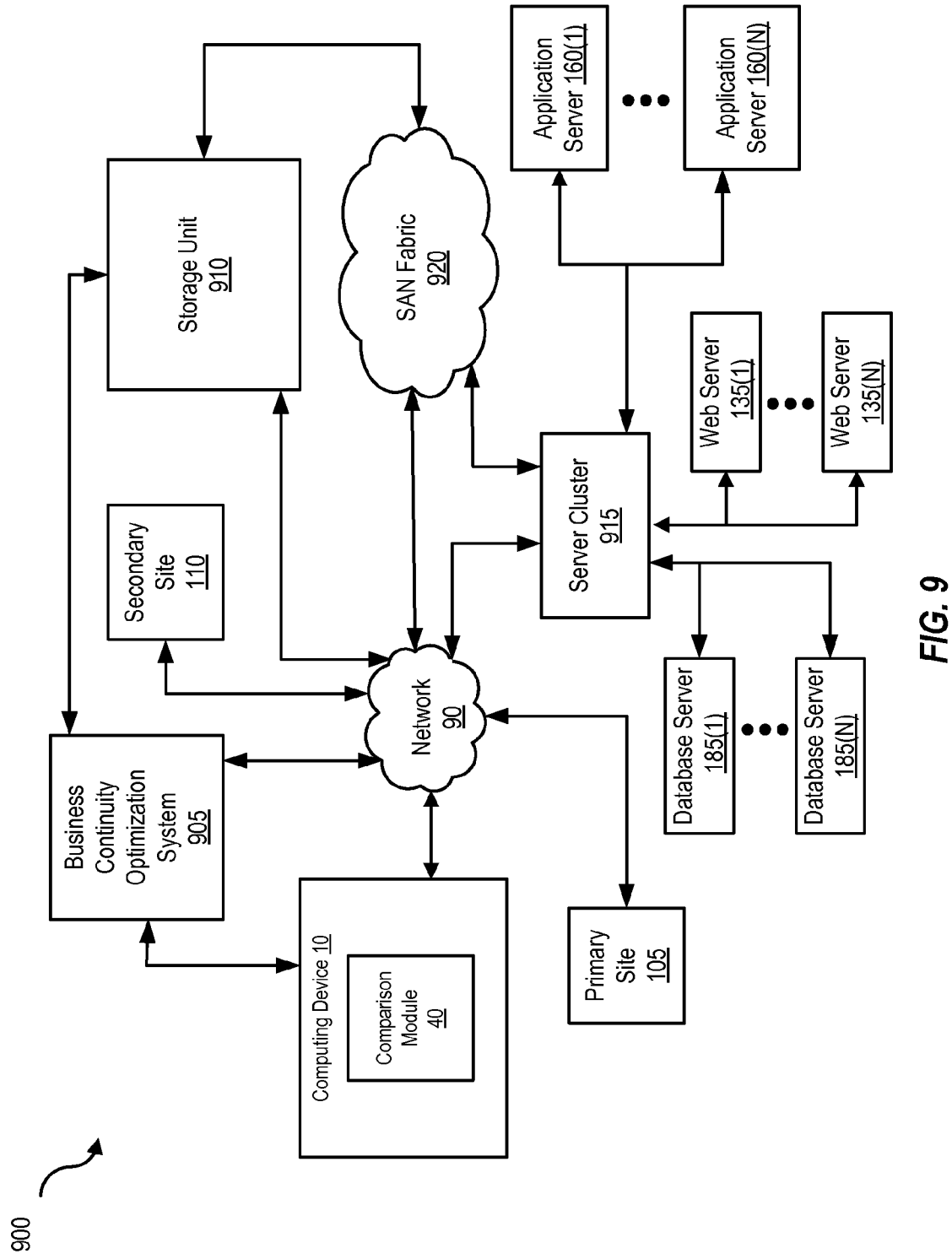
FIG. 9 is a block diagram of a networked system, illustrating how various computing entities can communicate via a network, according to one embodiment of the present invention.

FIG. 9 is a block diagram of a network architecture 900 in which computing device 10 may be coupled to network 90. In certain embodiments, network-attached storage (NAS) devices may be configured to communicate with computing device 10 using various protocols, such as Network File System (NFS), Server Message Block (SMB), or Common Internet File System (CIFS).

Primary site 105 and secondary site 110 may also be connected to a network 90. Network 90 generally represents any type or form of computer network or architecture capable of facilitating communication between multiple computing devices. Network 90 may facilitate communication between computing device 10, primary site 105, and secondary site 110. In certain embodiments, and with reference to computing system 800 of FIG. 8, a communication interface, such as communication interface 845 in FIG. 8, may be used to provide connectivity between computing device 10 and network 180. It should be noted that the embodiments described and/or illustrated herein are not limited to the Internet or any particular network-based environment. For example, network 90 can be a Storage Area Network (SAN).

In at least one embodiment, all or a portion of one or more of the embodiments disclosed herein may be encoded as a computer program and loaded onto and executed by computing device 10, or by computing entities on primary site 105 or secondary site 110, or any combination thereof. All or a portion of one or more of the embodiments disclosed herein may also be encoded as a computer program, stored in computing device 10, or on computing entities on primary site 105 or secondary site 110, and distributed over network 90.

In some examples, all or a portion of the computing device in FIG. 1A may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a comparison module 40 may transform behavior of a computing device in order to cause the computing device to perform business continuity optimization.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
retrieving a minimum functional template and a minimum acceptable template;
comparing a first representation of a primary site and the minimum functional template, wherein
the first representation represents a plurality of units of computing entities and a plurality of relationships between the plurality of units of computing entities;
comparing a second representation of a secondary site and the minimum acceptable template;
determining that the primary site represented by the first representation meets a minimum functional operating state represented by the minimum functional template; and
based on the determining, migrating one or more units of computing entities of the plurality of units of computing entities from the primary site to the secondary site, wherein
the one or more units of computing entities do not have a co-location relationship with one or more remaining computing entities of the plurality of computing entities,
as a result of the migration, the second representation matches a minimum acceptable operating state of the primary site represented by the minimum acceptable template, and
the one or more units of computing entities are not necessary to maintain the minimum functional operating state of the primary site.

2. The method of claim 1, further comprising:
receiving a user input from a user, wherein
the user input comprises the representation; and
clustering the representation into one or more groups, wherein
the one or more groups represent a minimum functional operating state of a primary site, and
the minimum functional operating state is represented by the minimum functional template.

3. The method of claim 2, wherein
the clustering is based on one or more similar characteristics shared between two or more of each of the plurality of units of computing entities,
the minimum functional template is stored on a computing device, and
the result of the determining is provided to the user.

4. The method of claim 3, further comprising:
notifying the user of the minimum functional operating state of the primary site as represented by the minimum functional template;
receiving an another user input from the user indicating a minimum acceptable operating state of the primary site;
creating a minimum acceptable template based on the minimum acceptable operating state, wherein
the minimum acceptable template is a representation of the minimum acceptable operating state of the primary site; and
storing the minimum acceptable template on the computing device.

5. The method of claim 3, wherein
the one or more similar characteristics shared between two or more of each of the plurality of units of computing entities comprise:
one or more similar hardware attributes shared between two or more of each of the plurality of units of computing entities; or
a range of one or more similar hardware attributes shared between two or more of each of the plurality of units of computing entities.

6. The method of claim 2, wherein
the representation of the minimum functional operating state of the primary site created by the clustering comprises representing the plurality of units of computing entities using one or more vertices.

7. The method of claim 1, wherein
the clustering is performed using a clustering algorithm which implements hierarchical clustering.

8. The method of claim 1, wherein
the threshold is established by a configuration of a disaster recovery site, a service level agreement, or a configuration drift level.

9. The computer-implemented method of claim 1, further comprising:
generating the minimum functional template, wherein
the minimum functional template represents the minimum functional operating state of a primary site;
generating the minimum acceptable template, wherein
the minimum acceptable template represents the minimum acceptable operating state of the primary site; and
storing the minimum functional template and the minimum acceptable template on a computing device.

10. The computer-implemented method of claim 1, further comprising:
performing the second representation of the minimum acceptable operating state using vertices; and
determining whether the second representation and the minimum acceptable template are isomorphic.

11. A computer readable storage medium comprising program instructions executable to:
retrieve a minimum functional template and a minimum acceptable template;
compare a first representation of a primary site and the minimum functional template, wherein
the first representation represents a plurality of units of computing entities and a plurality of relationships between the plurality of units of computing entities;
compare a second representation of a secondary site and the minimum acceptable template;
determine that the primary site represented by the first representation meets a minimum functional operating state represented by the minimum functional template; and
based on the determining, migrate one or more units of computing entities of the plurality of units of computing entities from the primary site to the secondary site, wherein
the one or more units of computing entities do not have a co-location relationship with one or more remaining computing entities of the plurality of computing entities,
as a result of the migration, the second representation matches a minimum acceptable operating state of the primary site represented by the minimum acceptable template, and
the one or more units of computing entities are not necessary to maintain the minimum functional operating state of the primary site.

12. The computer readable storage medium of claim 11, further comprising:
receiving a user input from a user, wherein
the user input comprises the representation; and
clustering the representation into one or more groups, wherein
the one or more groups represent a minimum functional operating state of the primary site, and
the minimum functional operating state is represented by the minimum functional template.

13. The computer readable storage medium of claim 12, wherein
the clustering is based on one or more similar characteristics shared between two or more of each of the plurality of units of computing entities,
the minimum functional template is stored on a computing device, and
the result of the determining is provided to the user.

14. The computer readable storage medium of claim 13, further comprising:
notifying the user of the minimum functional operating state of the primary site as represented by the minimum functional template;
receiving an another user input from the user indicating a minimum acceptable operating state of the primary site;
creating a minimum acceptable template based on the minimum acceptable operating state, wherein
the minimum acceptable template is a representation of the minimum acceptable operating state of the primary site; and
storing the minimum acceptable template on the computing device.

15. The computer readable storage medium of claim 13, wherein
the one or more similar characteristics shared between two or more of each of the plurality of units of computing entities comprise:
one or more similar hardware attributes shared between two or more of each of the plurality of units of computing entities; or
a range of one or more similar hardware attributes shared between two or more of each of the plurality of units of computing entities.

16. The computer readable storage medium of claim 12, wherein
the representation of the minimum functional operating state of the primary site created by the clustering comprises representing the plurality of units of computing entities using one or more vertices.

17. The computer readable storage medium of claim 11, wherein
- the clustering is performed using a clustering algorithm which implements hierarchical clustering, and
- the threshold is established by a configuration of a disaster recovery site, a service level agreement, or a configuration drift level.

18. A system comprising:
- one or more processors; and
- a memory coupled to the one or more processors, wherein the memory stores program instructions executable by the one or more processors to:
- retrieve a minimum functional template and a minimum acceptable template;
- compare a first representation of a primary site and the minimum functional template, wherein
  - the first representation represents a plurality of units of computing entities and a plurality of relationships between the plurality of units of computing entities;
- compare a second representation of a secondary site and the minimum acceptable template;
- determine that the primary site represented by the first representation meets a minimum functional operating state represented by the minimum functional template; and
- based on the determining, migrate one or more units of computing entities of the plurality of units of computing entities from the primary site to the secondary site, wherein
  - the one or more units of computing entities do not have a co-location relationship with one or more remaining computing entities of the plurality of computing entities,
  - as a result of the migration, the second representation matches a minimum acceptable operating state of the primary site represented by the minimum acceptable template, and
  - the one or more units of computing entities are not necessary to maintain the minimum functional operating state of the primary site.

19. The system of claim 18, further comprising:
- receiving a user input from a user, wherein
  - the user input comprises the representation; and
- clustering the representation into one or more groups, wherein
  - the one or more groups represent a minimum functional operating state of the primary site, and
  - the minimum functional operating state is represented by the minimum functional template.

20. The system of claim 19, wherein
- the clustering is based on one or more similar characteristics shared between two or more of each of the plurality of units of computing entities,
- the minimum functional template is stored on a computing device, and
- the result of the determining is provided to the user.

21. The system of claim 20, further comprising:
- notifying the user of the minimum functional operating state of the primary site as represented by the minimum functional template;
- receiving an another user input from the user indicating a minimum acceptable operating state of the primary site;
- creating a minimum acceptable template based on the minimum acceptable operating state, wherein
  - the minimum acceptable template is a representation of the minimum acceptable operating state of the primary site; and
- storing the minimum acceptable template on the computing device.

22. The system of claim 18, wherein
- the clustering is performed using a clustering algorithm which implements hierarchical clustering, and
- the threshold is established by a configuration of a disaster recovery site, a service level agreement, or a configuration drift level.

\* \* \* \* \*